(12) United States Patent
Sawada et al.

(10) Patent No.: US 8,879,114 B2
(45) Date of Patent: Nov. 4, 2014

(54) IMAGE FORMING APPARATUS PERFORMING COMBINE PRINTING

(75) Inventors: Kenichi Sawada, Toyohashi (JP); Takatsugu Kuno, Toyokawa (JP); Masahiro Imamura, Toyokawa (JP); Atsushi Tomita, Toyohashi (JP); Yoichi Kurumasa, Toyokawa (JP); Ryosuke Nishimura, Toyokawa (JP); Tetsuya Tokumoto, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 137 days.

(21) Appl. No.: 13/543,416

(22) Filed: Jul. 6, 2012

(65) Prior Publication Data
US 2013/0016366 A1 Jan. 17, 2013

(30) Foreign Application Priority Data
Jul. 12, 2011 (JP) .................................. 2011-153827

(51) Int. Cl.
*G06F 15/00* (2006.01)
*H04N 1/387* (2006.01)
*H04N 1/00* (2006.01)

(52) U.S. Cl.
CPC ...... *H04N 1/3875* (2013.01); *H04N 2201/0091* (2013.01); *H04N 1/00453* (2013.01); *H04N 2201/0082* (2013.01); *H04N 1/0044* (2013.01); *H04N 2201/0094* (2013.01)
USPC ......................................................... 358/1.2

(58) Field of Classification Search
USPC ......................................................... 358/1.2
See application file for complete search history.

(56) References Cited

U.S. PATENT DOCUMENTS

| 7,659,999 | B2 * | 2/2010 | Karn et al. ................... 358/1.12 |
| 2002/0051205 | A1 | 5/2002 | Teranishi et al. |
| 2007/0216973 | A1 | 9/2007 | Tagawa |
| 2010/0188679 | A1 | 7/2010 | Nakagawa |

FOREIGN PATENT DOCUMENTS

| JP | 2001189843 A | 7/2001 |
| JP | 2006-247873 A | 9/2006 |
| JP | 2007-280369 A | 10/2007 |
| JP | 2010-041063 A | 2/2010 |
| JP | 2010-135977 A | 6/2010 |
| JP | 2010171906 A | 8/2010 |

OTHER PUBLICATIONS

Japanese Office Action (Notice of Grounds of Rejection) dated Nov. 12, 2013, issued in corresponding Japanese Patent Application No. 2011-153827, and an English Translation thereof. (4 pgs.).

\* cited by examiner

*Primary Examiner* — Saeid Ebrahimi Dehkordy
(74) *Attorney, Agent, or Firm* — Buchanan Ingersoll & Rooney PC

(57) ABSTRACT

When an instruction for combine setting is accepted, a reduction ratio of an original image is set as a first reduction ratio based on an orientation of the original image and an orientation of output paper. When an instruction to change the reduction ratio for the previewed original image is accepted, if a reduction ratio after the change (a second reduction ratio) falls within a prescribed range from the first reduction ratio, the first reduction ratio is set as a reduction ratio of the original image for arranging onto a sheet of output paper in combination.

20 Claims, 17 Drawing Sheets

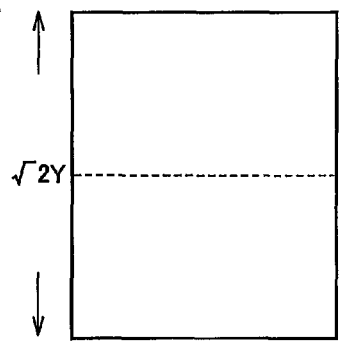
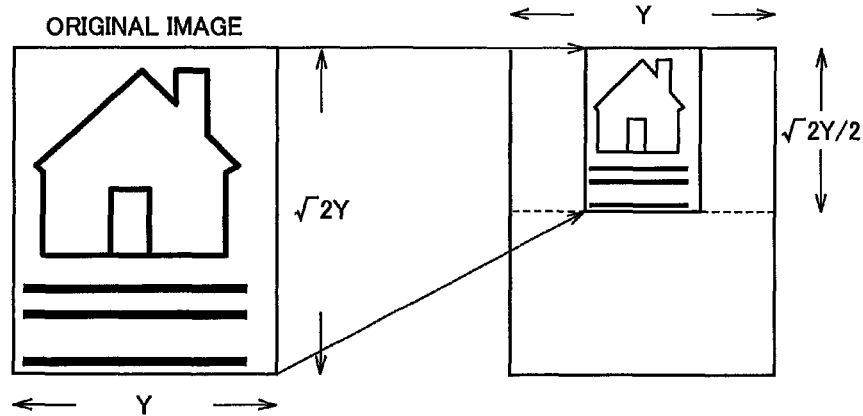
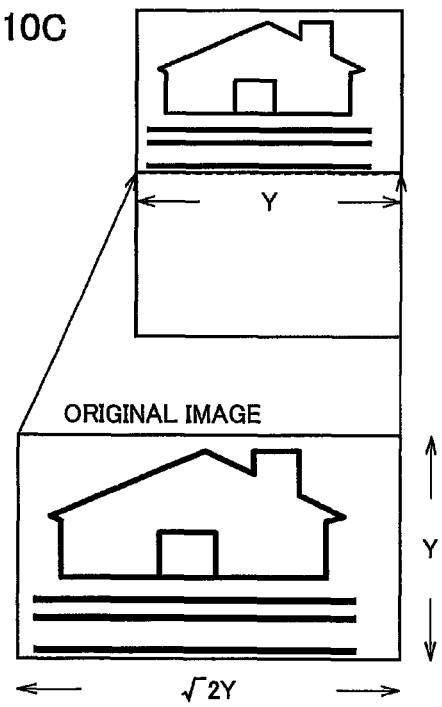

IMAGE FORMING APPARATUS PERFORMING COMBINE PRINTING

This application is based on Japanese Patent Application No. 2011-153827 filed with the Japan Patent Office on Jul. 12, 2011, the entire content of which is hereby incorporated by reference.

BACKGROUND OF THE INVENTION

1. Field of the Invention

The present invention relates to an image forming apparatus, and more particularly to an image forming apparatus that sets a magnification in combine printing based on user's operation.

2. Description of the Related Art

In general, in an image forming apparatus such as a copier, a printer, a scanner or an MFP (Multi-Functional Peripheral), when a plurality of originals or photographs taken by a digital camera are printed, a function of combining and printing a plurality of originals on each predetermined page, that is, a function of printing originals of N pages onto one page, is known in order to save printed paper. This function is called an N-in-1 function (hereinafter referred to as N-in-1).

For example, Japanese Laid-Open Patent Publication No. 2010-135977 discloses a technique for providing better visibility in N-in-1.

Japanese Laid-Open Patent Publication Nos. 2006-247873, 2010-041063 and 2007-280369 disclose techniques to display a preview image of a scanned original on an LCD (Liquid Crystal Display) operation panel and to set finishing intuitively through a predetermined operation by the user on the LCD operation panel.

However, with the conventional technique above, when the user wishes to combine and print as many pages (images) as possible with a character size readable in a sheet of paper, the user predicts the setting such as 2-in-1, 4-in-1, etc. based on the character size in the original. Therefore, the character size, when printed, may become too small because of excessive aggregation, or paper may be wasted because of less aggregation.

In order to solve such a problem, a preview function may be used. According to this manner, the user operates to reduce a preview image appearing on an LCD operation panel thereby making the N-in-1 setting.

However, even when the image is previewed in a reduced size, the user cannot determine whether the image displayed properly in the reduced size fits in 2-in-1 or 4-in-1 and therefore has to decide by his feeling, and, as a result, the printing is sometimes failed.

For example, in a case of 2-in-1 printing, when the user performs an operation for further reduction by mistake, while images can fit in 2-in-1, the character or image printed becomes too small, and the paper size in which the images are supposed to be printed by 2-in-1 is not effectively used, resulting in a print failure. Therefore, it is necessary to fix a reduction ratio in advance so that two pages of originals can be fitted in one page without a loss.

SUMMARY OF THE INVENTION

The present invention is made in light of the foregoing problems. An object of the present invention is to provide an image forming apparatus and an image processing method that can perform N-in-1 setting with an intuitively easy operation and that can prevent a print failure due to an operating error of a user.

In order to achieve the object, according to an aspect of the present invention, an image forming apparatus for performing combine setting includes: an input unit for accepting an operation input by a user; a setting unit for performing combine setting for arranging a plurality of designated original images onto a sheet of output paper in combination; and a display unit for previewing at least one original image of the plurality of designated original images and an output result thereof on a display device. When the input unit accepts an instruction for combine setting, the setting unit executes a first setting process of setting a reduction ratio of the original image as a first reduction ratio based on an orientation of the original image and an orientation of the output paper. When the input unit accepts an instruction to change the reduction ratio of the previewed original image, the setting unit executes a second setting process of calculating a reduction ratio after the change as a second reduction ratio, comparing the first reduction ratio with the second reduction ratio, and, if the second reduction ratio falls within a prescribed range from the first reduction ratio, setting the first reduction ratio as a reduction ratio of the original image for arranging on the sheet of output paper in combination.

According to another aspect of the present invention, an image forming apparatus for performing combine setting includes: an input unit for accepting an operation input by a user; a setting unit for performing combine setting for arranging a plurality of designated original images onto a sheet of output paper in combination; and a display unit for previewing at least one original image of the plurality of designated original images and an output result thereof on a display device. When the input unit accepts an instruction for combine setting, the setting unit executes a first setting process of setting a reduction ratio of the original image as a first reduction ratio based on an orientation of the original image and an orientation of the output paper. When the input unit accepts an instruction to change the reduction ratio of the previewed original image, the setting unit executes a second setting process of calculating a reduction ratio after the change as a second reduction ratio, comparing the first reduction ratio with the second reduction ratio, and, if the second reduction ratio is greater than the first reduction ratio, setting the first reduction ratio as a reduction ratio of the original image for arranging on the sheet of output paper in combination.

Preferably, in the first setting process, when a number N of originals to be combined is two to an odd power and when the original image and the output paper are in the same orientation, the setting unit sets a reduction ratio of the original to $1/2N$, and when a number N of originals to be combined is two to an odd power and when the original image and the output paper are in different orientations, the setting unit sets a reduction ratio of the original to $1/N$. When a number N of originals to be combined is two to an even power and when the original image and the output paper are in the same orientation, the setting unit sets a reduction ratio of the original to $1/N$, and when a number N of originals to be combined is two to an even power and when the original image and the output paper are in different orientations, the setting unit sets a reduction ratio of the original to $1/2N$.

Preferably, when the input unit does not accept an instruction for combine setting, the setting unit does not perform the first setting process and compares a reduction ratio stored beforehand with a reduction ratio of the original image in the previewed output result, and, if the reduction ratio stored beforehand is greater than the reduction ratio in the preview, the setting unit sets the reduction ratio stored beforehand as a reduction ratio of the original image for arranging on the sheet of output paper in combination.

Preferably, the display device includes a touch panel as one of the input unit. The setting unit calculates the second reduction ratio based on a moving distance of a touch position with the instruction to change the reduction ratio that is accepted by the touch panel as the input unit.

Preferably, the display unit updates the preview of the output result according to the reduction ratio set in the second setting process in the setting unit, and, in the update, displays a layout frame according to a size of the output paper and a number of the original images to be arranged in combination such that the layout frame is superimposed on the preview of the output result.

Preferably, when the input unit accepts an instruction to change the reduction ratio of the previewed original image, the display unit displays, in the preview of the output result, an output result in which a plurality of original images are combined according to the reduction ratio set in the second setting process.

Preferably, the display unit previews the plurality of original images with page numbers.

Preferably, the image forming apparatus further includes a setting unit for presetting a reduction ratio to be adopted as a reduction ratio of the original image for arranging on the sheet of output paper in combination, from between the reduction ratio set in accordance with the instruction for combine setting in the input unit and the reduction ratio set in accordance with the instruction to change the reduction ratio of the previewed original image in the input unit.

According to a further aspect of the present invention, an image processing method in an image forming apparatus that performs combine setting includes the steps of: accepting an instruction for combine setting from an input device; setting a reduction ratio of an original image as a first reduction ratio based on an orientation of the original image and an orientation of output paper in accordance with the instruction; previewing the original image and an output result thereof on a display device; accepting, from the input device, an instruction to change the reduction ratio of the previewed original image; calculating a reduction ratio after the change as a second reduction ratio; and comparing the first reduction ratio with the second reduction ratio, and, if the second reduction ratio falls within a prescribed range from the first reduction ratio, setting the first reduction ratio as a reduction ratio of the original image for arranging on the sheet of output paper in combination.

According to yet another aspect of the present invention, an image processing method in an image forming apparatus that performs combine setting includes the steps of: accepting an instruction for combine setting from an input device; setting a reduction ratio of an original image as a first reduction ratio based on an orientation of the original image and an orientation of output paper in accordance with the instruction; previewing the original image and an output result thereof on a display device; accepting, from the input device, an instruction to change the reduction ratio of the previewed original image; calculating a reduction ratio after the change as a second reduction ratio; and comparing the first reduction ratio with the second reduction ratio, and, if the second reduction ratio is greater than the first reduction ratio, setting the first reduction ratio as a reduction ratio of the original image for arranging on the sheet of output paper in combination.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10A to FIG. 10C are diagrams depicting layout examples according to portrait paper and an original size in a case of 2-in-1.

DESCRIPTION OF THE PREFERRED EMBODIMENTS

Figure 1:
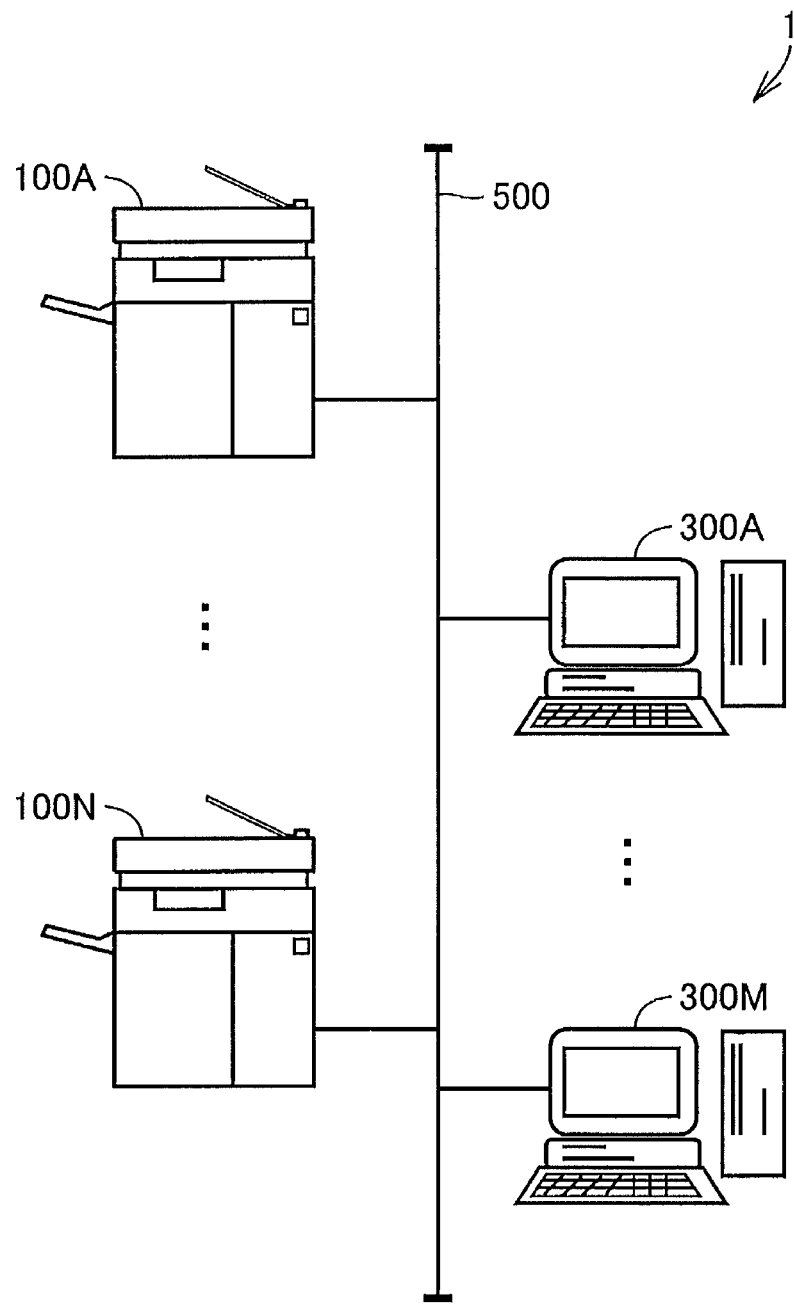
FIG. 1 is a diagram showing a specific example of a configuration of an image forming system according to an embodiment.

In the following, embodiments of the present invention will be described with reference to the figures. In the following description, the same parts and components are denoted with the same reference numerals. Their names and functions are also the same.

System Configuration

FIG. 1 is a diagram showing a specific example of a configuration of an image forming system 1 according to an embodiment. Referring to FIG. 1, image forming system 1 includes a plurality of image forming apparatuses 100A, . . . , 100N and a plurality of information processing apparatuses 300A, . . . , 300M. Image forming apparatuses 100A, . . . , 100N are collectively referred to as image forming apparatus 100, and information processing apparatuses 300A, . . . , 300M are collectively referred to as information processing apparatus 300.

Image forming apparatus 100 and information processing apparatus 300 are connected via a network 500. Network 500 may be any one of a network using a dedicated line such as a LAN (Local Area Network), a network using a general circuit, and a network through wireless communication.

In the present embodiment, it is assumed that image forming apparatus 100 is an MFP having the function as a digital multifunction device having scanner, copy, and printer functions. However, image forming apparatus 100 is not limited to an MFP and, in this example, may be any device at least having the print function.

Image forming apparatus 100 is a device that forms on paper a copy image of an original image obtained by scanning and an image generated from print data transmitted from information processing apparatus 300. Here, print data refers to an imaging instruction in a page description language, in which an imaging instruction issued by an operating system or an application program of information processing apparatus 300 is converted by a printer driver into a page description language that can be processed by image forming apparatus 100, or document data written in a file format such as PDF (Portable Document Format), TIFF (Tagged Image File Format), JPEG (Joint Photographic Experts Group), or XPS (XML Paper Specification).

An original image obtained by scanning may be subjected to a variety of settings (file format, layout setting, resolution setting, and the like) in the image forming apparatus and transmitted to information processing apparatus 300 or the like over network 500.

Information processing apparatus 300 may be a general personal computer. Information processing apparatus 300 generates print data in accordance with a user's instruction and transmits the generated print data to image forming apparatus 100.

Apparatus Configuration

Figure 2:
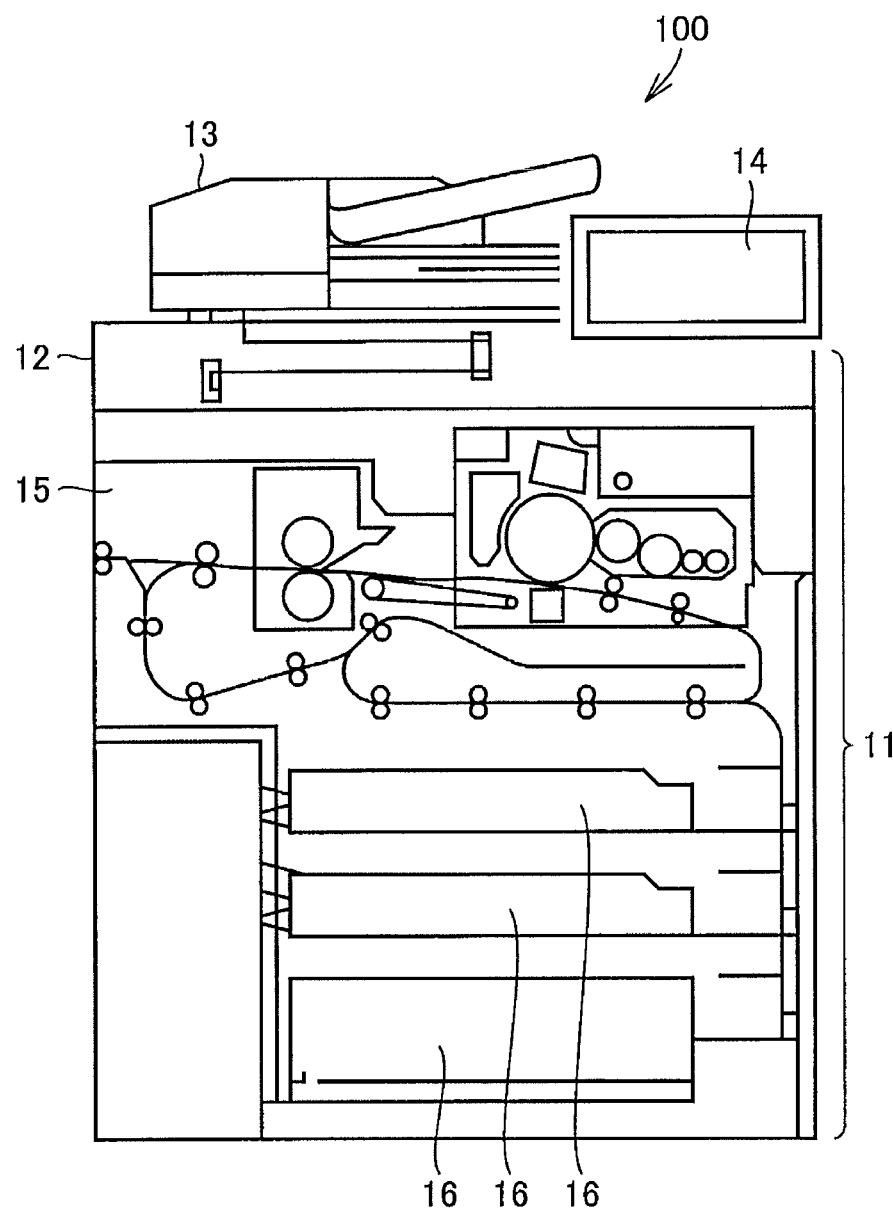
FIG. 2 is a diagram showing a specific example of an external view of an image forming apparatus included in the image forming system.

FIG. 2 is a diagram showing a specific example of an external view of image forming apparatus 100.

Referring to FIG. 2, image forming apparatus 100 includes a main unit 11 and an automatic document feeder (ADF) 13. The main unit 11 includes a scanner unit 12, an operation panel 14 including an LCD and the like, a printer unit 15, and paper feed trays 16.

An original set in ADF 13 is sent to scanner unit 12 and scanned as an original image. The original image is not limited to image data such as graphics and photographs and includes text data such as characters and symbols.

When the user makes a variety of settings concerning image forming, including combine setting (N-in-1), the kind of paper, image quality adjustment, and the like, on LCD operation panel 14, the original image is sent to printer unit 15 and subjected to a variety of image processing in printer unit 15. Thereafter, an image is formed on paper fed from one of paper feed trays 16.

Figure 3:
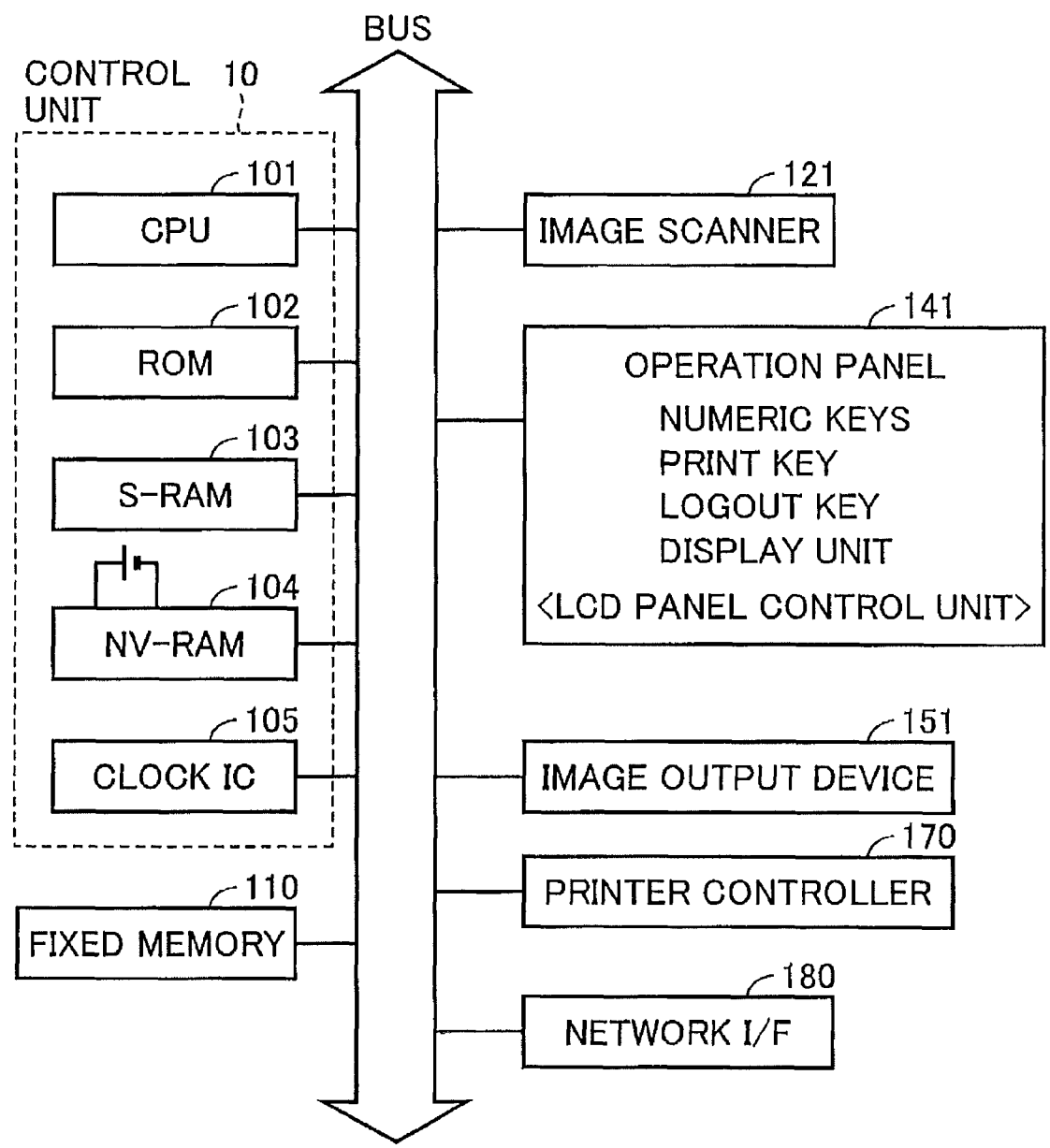
FIG. 3 is a block diagram showing a specific example of an internal configuration of the image forming apparatus.

FIG. 3 is a block diagram showing a specific example of an internal configuration of image forming apparatus 100.

Referring to FIG. 3, image forming apparatus 100 includes a control unit 10. Control unit 10 includes a CPU (Central Processing Unit) 101 for controlling the apparatus as a whole, a ROM (Read Only Memory) 102 for storing a control program, an S-RAM (Static Random Access Memory) 103 serving as a working memory, an NV-RAM (nonvolatile memory) 104 backed up by a battery for storing a variety of settings concerning image forming, and a clock IC (Integrated Circuit) 105.

Connected to control unit 10 through a bus are an image scanner 121 included in ADF 13 or scanner unit 12, an operation panel 14 having keys and a display for a variety of inputs, a network I/F (interface) 180 for transmitting/receiving a variety of information to/from an external device such as information processing apparatus 300 connected via network 500, a printer controller 170 for generating a copy image from print data received from network I/F 180, and an image output device 151 included in printer unit 15 for forming a copy image on paper.

A fixed memory 110 is connected to control unit 10 through a bus. Fixed memory 110 is, for example, a hard disk device.

Information processing apparatus 300 is configured as a general personal computer as described above. An example of the apparatus configuration includes a configuration of a general computer device including a CPU, a RAM, a fixed memory (for example, a hard disk device) and having a monitor, a keyboard, a mouse, and the like connected thereto.

Operation Overview

In image forming apparatus 100, an original image to be processed is previewed on operation panel 14, and an original image in a case where N originals are arranged on a sheet of paper according to the preset N-in-1 setting or the N-in-1 setting made by the user (also referred to as an N-in-1 original image) is also previewed.

A user operation to enlarge or reduce the preview of the original image is accepted on operation panel 14 to change N in the N-in-1 setting, so that the preview of the changed N-in-1 original image is changed.

In a case where the size of the changed N-in-1 original image is deviated by a prescribed amount or more from the size assigned to one original in the N-in-1 setting, the size of the N-in-1 original image is automatically changed to the size closest to the size assigned to one original on paper in the N-in-1 setting specified by the operation, so as to the optimum N-in-1 setting is achieved. The preview after the change is displayed.

Functional Configuration

Figure 4:
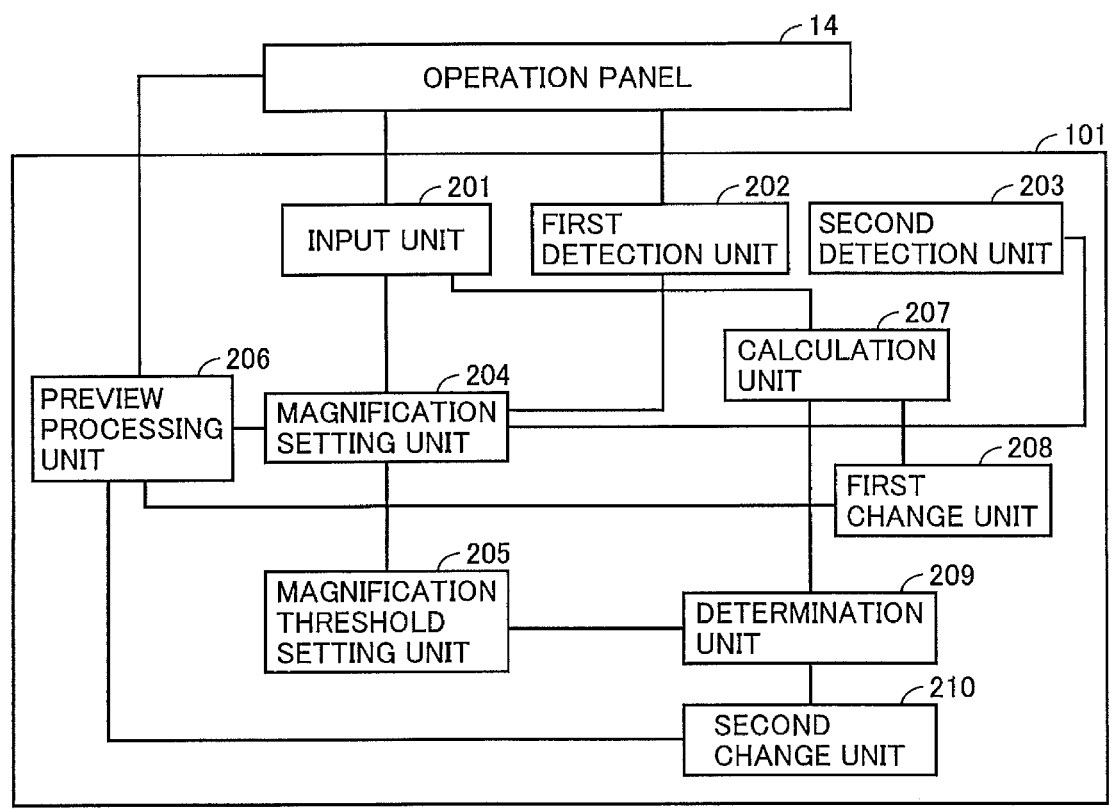
FIG. 4 is a block diagram showing a specific example of a functional configuration of the image forming apparatus.

FIG. 4 is a block diagram showing a specific example of a functional configuration of image forming apparatus 100 for implementing the operation above. The functions shown in FIG. 4 are formed mainly on CPU 101 by CPU 101 reading out a control program stored in ROM 102 and expanding the read program onto S-RAM 103 for execution. However, at least part of the functions may be implemented with a hardware configuration such as an electric circuit.

Referring to FIG. 4, CPU 101 includes an input unit 201 for accepting an operation input from a user on operation panel 14, a first detection unit 202 for detecting the paper size and the paper orientation specified by the operation input on operation panel 14, a second detection unit 203 for detecting the original size and the original orientation based on an input signal from a not-shown sensor or the like, a magnification setting unit 204 for setting a magnification by performing a setting process described later using the user operation and the detection result, a magnification threshold setting unit 205 for setting a magnification threshold value described later based on the set magnification, a preview processing unit 206 for allowing operation panel 14 to preview an original image and to preview an N-in-1 original image, a magnification calculation unit 207 for calculating a magnification based on the user's operation input on the preview on operation panel 14, a first change unit 208 for changing the magnification set by magnification setting unit 204 to the calculated magnification, a determination unit 209 for determining whether the magnification based on the user's operation input on the preview is appropriate based on the calculated magnification and the set magnification threshold value, and a second change unit 210 for changing the magnification set based on the determination result.

The details of the functions are illustrated in the operation flow described later.

Operation Flow

Figure 5:
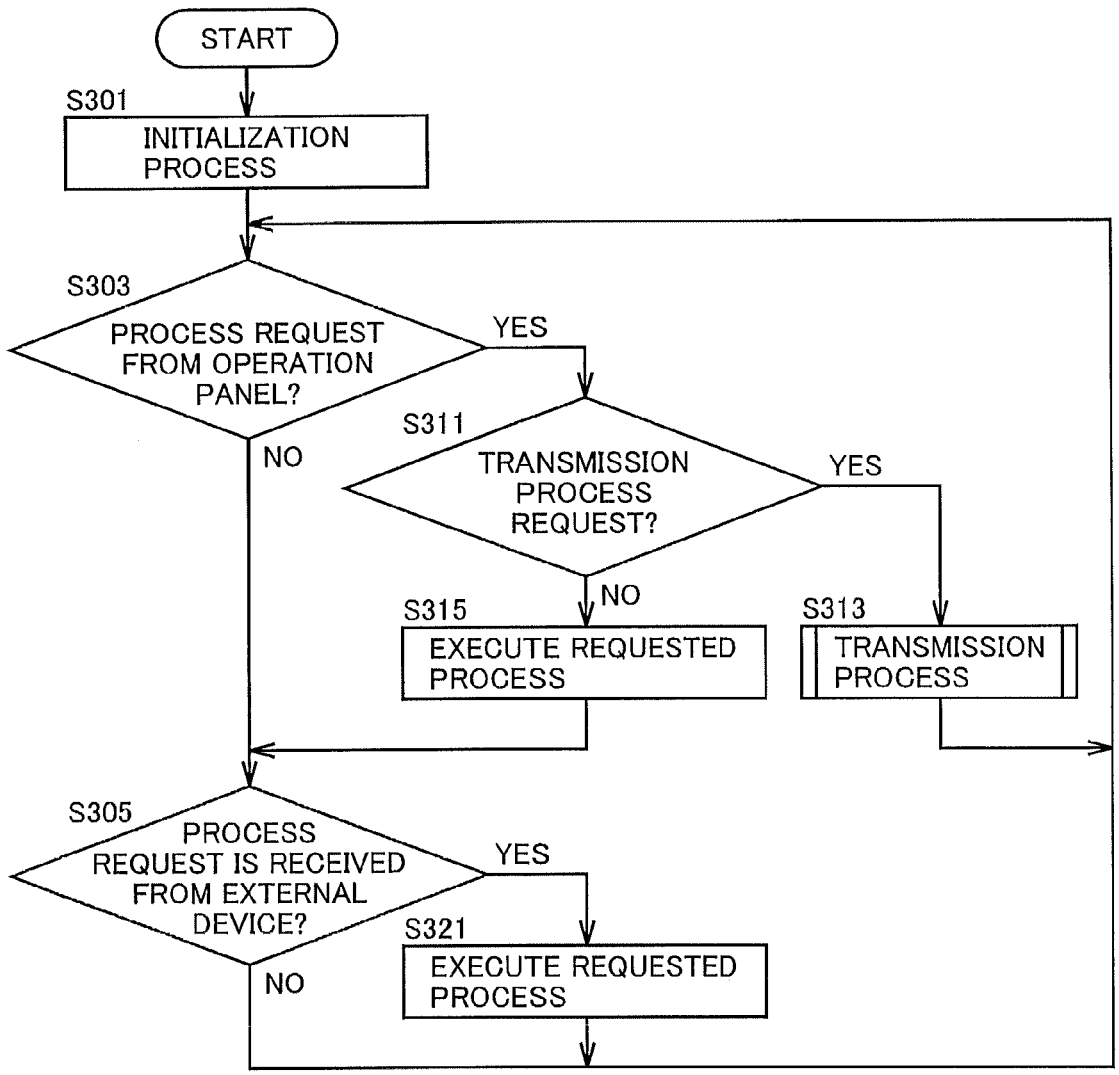
FIG. 5 is a flowchart illustrating an overall process flow in the image forming apparatus.

FIG. 5 is a flowchart illustrating an overall process flow in image forming apparatus 100. The process shown in the flowchart in FIG. 5 is implemented by CPU 101 reading out a control program stored in ROM 102 and expanding the program onto S-RAM 103 for execution. The process shown in FIG. 5 is started, for example, by power-on.

Referring to FIG. 5, upon start of the process, in CPU 101, first, an initialization process including clearing the memory and setting the standard mode is performed (step S301).

When the initialization process is finished, CPU 101 determines whether any process request (for example, a copy process, the N-in-1 setting, or any other various setting process) is made by the user through operation with key switches on operation panel 14 and on the display unit of image forming apparatus 100 (step S303). If a request is not made (NO in step S303), the process proceeds to step S305. The N-in-1 setting will be described later.

If any process request is made by the user (YES in step S303), CPU 101 determines whether it is a request for a scan transmission process of an original (step S311). If it is a request for a scan transmission process (YES in step S311), CPU 101 executes a transmission process (step S313).

If the requested process is not a transmission process (NO in step S311), CPU 101 executes the requested process (step S315). Here, the process other than the transmission process that is requested through operation with key switches on operation panel 14 and on the display unit of image forming apparatus 100 includes, for example, to copy or scan an original, to change the settings stored in NV-RAM 104, and the like.

When the process requested by the user is finished, the process proceeds to step S305. Specifically, CPU 101 determines whether any process request (for example, a document print process, a variety of setting processes, and the like) is made from an external device such as information processing apparatus 300 over network 500 (step S305). If a request is not made, the process proceeds to step S303.

If any process request is made from an external device (YES in step S305), CPU 101 executes the requested process (step S321). Here, other process includes a process for a print job transmitted from information processing apparatus 300, a process of changing a variety of settings stored in NV-RAM 104, and the like. When the process requested from an external device is completed, CPU 101 returns to step S303 and repeatedly executes the process described above.

Figure 6:
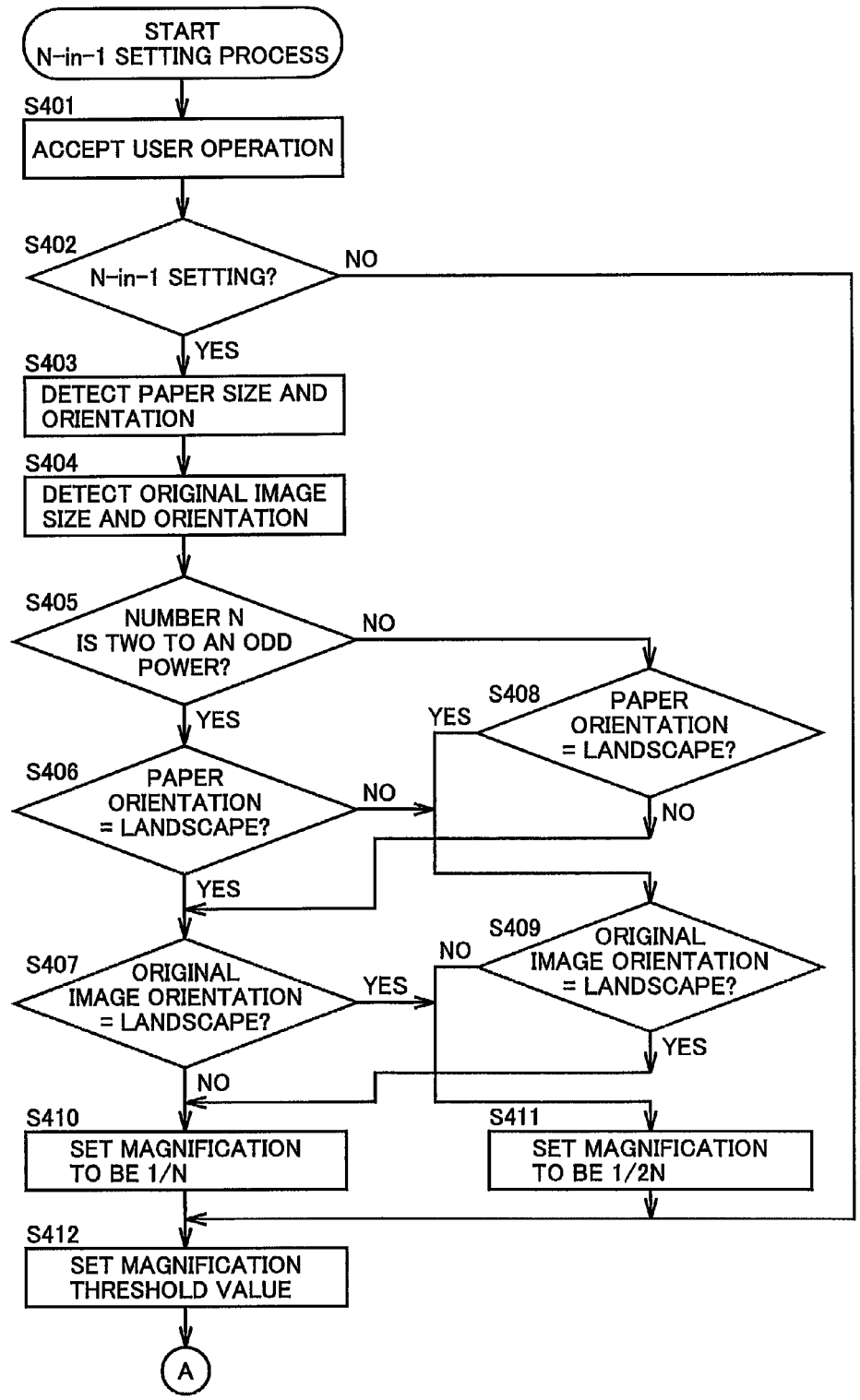
FIG. 6 and FIG. 7 are flowcharts illustrating a process flow in step S303 in FIG. 5.
Figure 7:
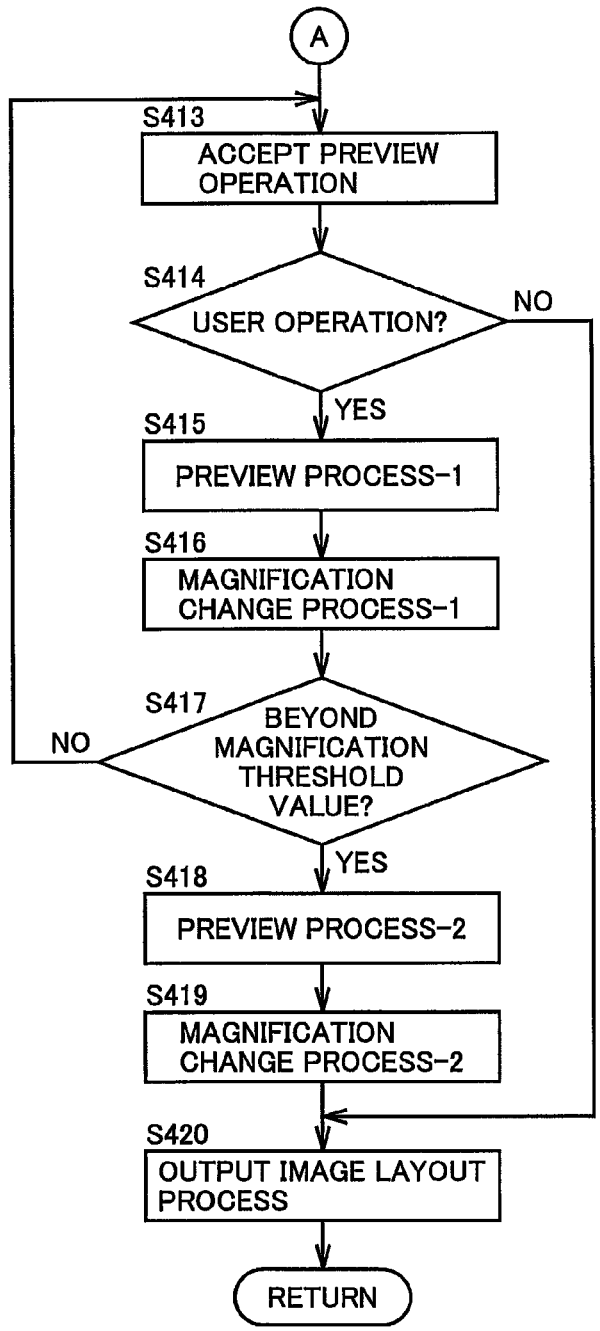

FIG. 6 and FIG. 7 are flowcharts illustrating a process flow in a case where the user makes the N-in-1 setting in the step S303 above. More specifically, FIG. 6 and FIG. 7 show a control flow showing an example concerning the N-in-1 setting in which the magnification of an original image is set based on the orientation of a paper size, the orientation of the original image, and the number (N) of original images arranged on one page.

CPU 101 can perform the N-in-1 setting in a memory of S-RAM 103. Specifically, CPU 101 creates a layout of an original image arranged on one page and an output image in the memory. A variety of settings concerning image formation are made by referring to the information held in NV-RAM (nonvolatile memory) 104 or S-RAM 103.

Referring to FIG. 6, first, CPU 101 performs a process for accepting an operation by the user on operation panel 14 (S401) and determines whether the N-in-1 setting is made by the user (S402).

Here, the N-in-1 setting made by the user is not performed by the user's operation on a preview (hereinafter also referred to as a preview operation) but is automatically set in image forming apparatus 100. Once the automatically setting is made, an adjustment or change, for example, from 2-in-1 to 4-in-1 can be performed through the preview operation described later.

Similarly, when the user does not allow the automatic setting, that is, the N-in-1 setting (NO in S402), the process proceeds to a process of setting a magnification threshold value described later (S412), so that the user can make the N-in-1 setting through the preview operation in the following step (after step S413).

If the N-in-1 setting is made (YES in S402), CPU 101 detects a paper size and a paper orientation, among a variety of setting information requested to be processed from operation panel 14 (S403). If a paper size is not included in a variety of setting information from the user, for example, in the case of automatic original size scan, the original image size initially obtained by scanning can be set as a paper size.

Then, CPU 101 detects an original image size and an original image orientation from the scanned original image (S404).

In the next step (S405), CPU 101 determines whether the number N of original images to be arranged on one page is two to an odd power. For example, if a process request for 2-in-1, 8-in-1, or the like is made, CPU 101 determines that the number N of original images to be arranged on one page is two to an odd power (YES in S405). If a process request for 4-in-1, 16-in-1, or the like is made, CPU 101 determines that the number N of original images is two to an even power (NO in S405).

Then, CPU 101 compares the paper orientation above with the original image orientation and sets the magnification for scaling (reducing/enlarging) the original image (S406 to S411).

In the case where the number N of original images is two to an odd number (YES in S405 above), if the paper orientation is landscape (YES in S406) and the original image orientation is not landscape (NO in S407), or if the paper orientation is not landscape (NO in S406) and the original image orientation is landscape (YES in S409), CPU 101 sets the magnification such that the area of the scaled original image is 1/N of the area of one page of paper (S410).

On the other hand, if the paper orientation is landscape (YES in S406) and the original image is landscape (YES in S407), or if the paper orientation is not landscape (NO in S406) and the original image orientation is not landscape (NO in S409), CPU 101 sets the magnification such that the area of the scaled original image is 1/2N of the area of one page of paper (S411).

In other words, when the paper orientation differs from the original image orientation, the magnification is set to be 1/N, whereas when the paper orientation and the original image orientation are the same, the magnification is set to be 1/2N.

On the other hand, in the case where the number N of original images is not two to an odd power, that is, in the case where the number N of original images is two to an even power (NO in S405 above), if the paper orientation is landscape (YES in S408) and the original image orientation is landscape (YES in S409), or if the paper orientation is not landscape (NO in S408) and the original image orientation is not landscape (NO in S407), CPU 101 sets a magnification such that the area of the scaled original image is 1/N of the area of one page of paper (S410).

On the other hand, if the paper orientation is landscape (YES in S408) and the original image orientation is not landscape (NO in S409), or if the paper orientation is not landscape (NO in S408) and the original image orientation is landscape (YES in S407), CPU 101 sets the magnification such that the area of the scaled original image is 1/2N of the area of one page of paper (S411).

In other words, when the paper orientation and the original image orientation are the same, the magnification is set to be 1/N, whereas when the paper orientation differs from the original image orientation, the magnification is set to be 1/2N.

The magnification setting in steps S410 and S411 above will be described in more detail with specific examples. FIG. 8A to FIG. 8C and FIG. 9A to FIG. 9C depict layout examples according to landscape paper and a document size in the cases of 2-in-1 and 4-in-1, respectively.

First, the magnification setting in the case where the number N of original images is two to an odd power will be described.

In a case where the number N of original images is two, as an example of an odd power, that is, in a case of 2-in-1, CPU 101 sets such that a region that is one half of a page of paper serves as a print region in which one original image is to be arranged. More specifically, CPU 101 calculates the ratio between the length of the long side of the original image and the length of the long side of the print region, and sets the magnification that allows the original image to be fitted in the print region, based on the calculation result.

Figure 8A:
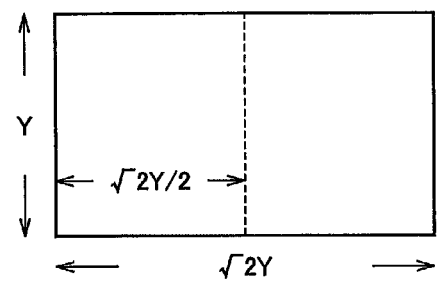
FIG. 8A to FIG. 8C are diagrams depicting layout examples according to landscape paper and an original size in a case of 2-in-1.

FIG. 8A shows paper having a vertical size of Y and a horizontal size of $\sqrt{2} \times Y$.

In the case of the 2-in-1 setting, CPU 101 creates two print regions that are two equal parts separated by the length that is a half of the long side of paper. This print region has a vertical length of Y and a horizontal length of $\sqrt{2} \times Y/2$. CPU 101 arranges two pages of original images into these two print regions.

Figure 8B:
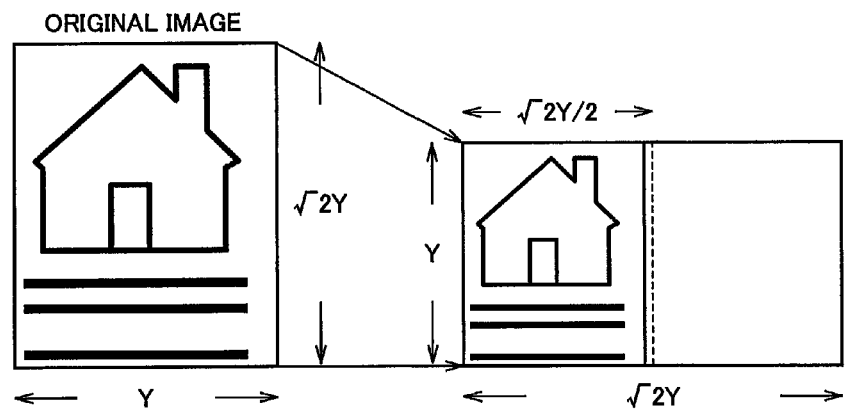

FIG. 8B shows an example in a case where an original image whose long side is in the vertical direction of a page is scaled down to be arranged in the print region.

In this case, the vertical length of the original image is $\sqrt{2} \times Y$ and the horizontal length thereof is Y. As for the print region in which this original image is to be arranged, the length in the direction along the long side of the original image, that is, the vertical direction, is Y. Here, CPU 101 calculates the ratio between the length $\sqrt{2} \times Y$ of the long side of the original image and the length Y along the long side of the print region, and sets the magnification for scaling the original image, based on the calculation result. The setting magnification in this case is $1/\sqrt{2}$ (about 0.707×). That is, the original image is reduced (scaled down) at the setting magnification of 0.707× and arranged in the print region with the orientation of the original image being kept.

Figure 8C:
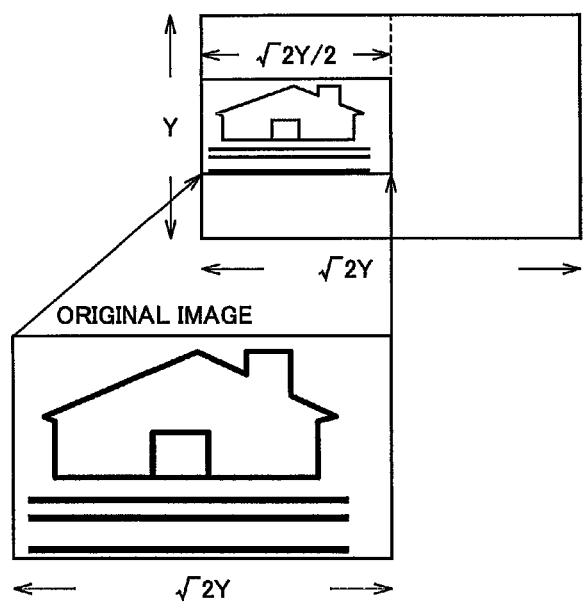

FIG. 8C shows an example of a case where an original image whose long side is in the horizontal direction of a page is scaled down to be arranged in the print region.

In this case, the horizontal length of the original image is $\sqrt{2} \times Y$ and the vertical length thereof is Y. As for the print region in which the original image is to be arranged, the length in the direction along the long side of the original image, that is, the horizontal direction, is $\sqrt{2} \times Y/2$. Here, CPU 101 calculates the ratio between the length $\sqrt{2} \times Y$ of the long side of the original image and the length $\sqrt{2} \times Y/2$ along the long side of the print region, and sets the magnification for scaling the original image, based on the calculation result. In this case, the setting magnification is ½ (0.5×). That is, the original image is reduced (scaled down) at the setting magnification of 0.5× and arranged in the print region.

Next, the magnification setting in the case where the number N of original images is two to an even power will be described.

In a case where the number N of original images is four, as an example of two to an even power, that is, in a case of 4-in-1, CPU 101 sets such that a region that is one quarter of a page of paper serves as a print region in which one original image is to be arranged. Specifically, CPU 101 calculates the ratio between the length of the long side of the original image and the length of the long side of the print region and sets a magnification that allows the original image to be fitted in the print region, based on the calculation result.

Figure 9A:
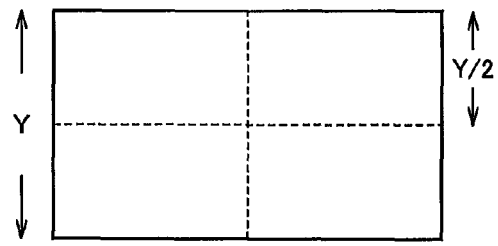
FIG. 9A to FIG. 9C are diagrams depicting layout examples according to landscape paper and an original size in a case of 4-in-1.

FIG. 9A shows paper having a vertical size of Y and a horizontal size of $\sqrt{2} \times Y$.

In the case of the 4-in-1 setting, CPU 101 creates four print regions that are four equal parts separated by the length that is a half of the long side of paper and by the length that is a half of the short side of paper. This print region has a vertical length of Y/2 and a horizontal length of $\sqrt{2} \times Y/2$. CPU 101 arranges four pages of original images into these four print regions.

Figure 9B:
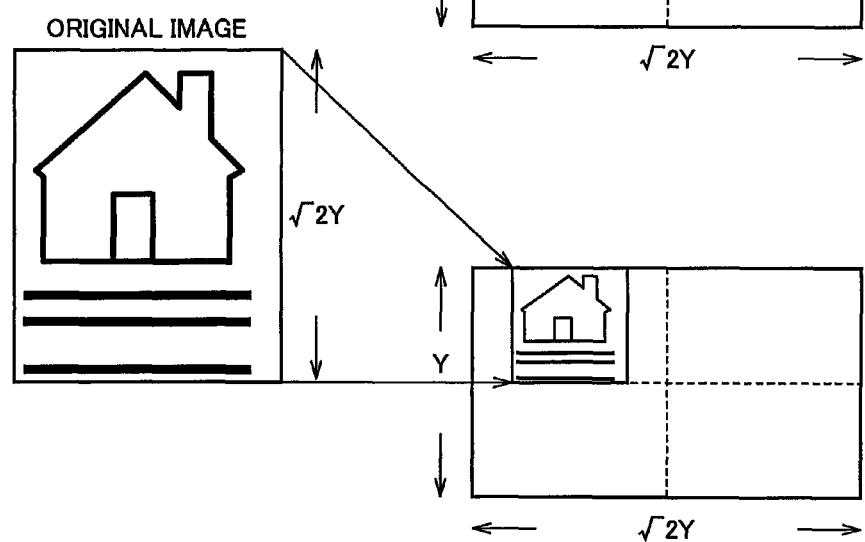

FIG. 9B shows an example in a case where an original image whose long side is in the vertical direction of a page is scaled down to be arranged in the print region.

In this case, the vertical length of the original image is $\sqrt{2} \times Y$ and the horizontal length thereof is Y. As for the print region in which this original image is to be arranged, the length in the direction along the long side of the original image, that is, the vertical length, is Y/2. Here, CPU 101 calculates the ratio between the length $\sqrt{2} \times Y$ of the long side of the original image and the length Y/2 along the long side of the print region and sets a magnification for scaling the original image, based on the calculation result. The setting magnification in this case is $½\sqrt{2}$ (about 0.353×). That is, the original image is reduced (scaled down) at the setting magnification of 0.353× and arranged in the print region.

Figure 9C:
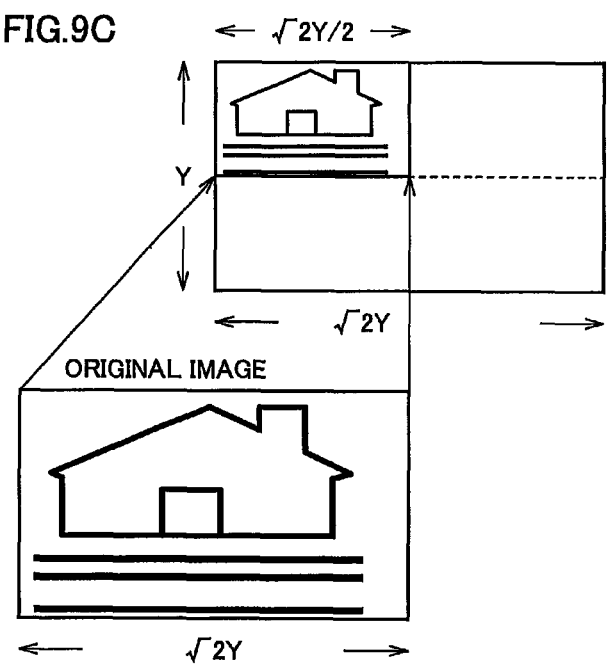

FIG. 9C shows an example of a case where an original image whose long side is in the horizontal direction of a page is scaled down to be arranged in the print region.

In this case, the horizontal length of the original image is $\sqrt{2} \times Y$ and the vertical length thereof is Y. As for the print region in which this original image is to be arranged, the length in the direction along the long side of the original image, that is, the horizontal direction is $\sqrt{2} \times Y/2$. Here, CPU 101 calculates the ratio between the length $\sqrt{2} \times Y$ of the long side of the original image and the length $\sqrt{2} \times Y/2$ along the long side of the print region and sets a magnification for scaling the original image, based on the calculation result. The setting magnification in this case is ½ (0.5×). That is, the original image is reduced (scaled down) at the setting magnification of 0.5× and arranged in the print region with the orientation of the original image being kept.

In both examples in FIG. 8A to FIG. 8C and FIG. 9A to FIG. 9C, the paper is landscape where the vertical size is Y and the horizontal size is $\sqrt{2} \times Y$. However, even in the case of portrait paper where the vertical size is $\sqrt{2} \times Y$ and the horizontal size is Y, the process of calculating a magnification is the same.

FIG. 10A to FIG. 10C show layout examples according to portrait paper and an original size in the case of 2-in-1.

CPU 101 sets a setting magnification to ½ (0.5×) as shown in FIG. 10B through a similar calculation process as described above, in a case where the vertical direction of a page is the long side. CPU 101 set a setting magnification to $1/\sqrt{2}$ (about 0.707×) as shown in FIG. 10C so that the horizontal direction is the long side.

In the examples above, the setting for 2-in-1 as an example of the case where N is an odd power, and the setting for 4-in-1 as an example of the case where N is an even power have been described. However, the setting is similar even when the number N is varied to 8-in-1, 16-in-1, and the like.

CPU 101 retains the set magnification Mx in NV-RAM (nonvolatile memory) 104 or S-RAM 103. The initial value of the magnification Mx is initialized to one (=the same magnification) in the initialization process in step S301 above.

The magnification Mx can be varied to any value, for example, in decrements of 0.01, such as 1 (the same magnitude) to 0.01, or in decrements of a smaller value.

Referring to FIG. 6 again, when the magnification is set in step S410 or step S411 above, in step S412, CPU 101 sets a magnification threshold value.

The "magnification threshold value" set here refers to a magnification value that is referred to in a process of adjusting the N-in-1 setting through the user operation described later.

For example, in a case where 1-in-1, 2-in-1, or 4-in-1 is set, CPU 101 sets the value calculated in the magnification setting described above as a magnification threshold value, for example, such as M1=1, M2=0.707, M3=0.5, M4=0.353, Mn= . . . , that is, sets a magnification exactly fitted for N-in-1 and retains the same as a magnification threshold value. Alternatively, the magnification may be prepared in a setting value table and may be read by CPU 101.

Next, referring to FIG. 7, after step S413, CPU 101 performs a process of accepting an operation on a preview screen on operation panel 14 by the user.

When the magnification is set in step S410 or step S411 above, CPU 101 previews an original image to be processed and an N-in-1 original image arranged on paper with the magnification of the original being set, on operation panel 14.

Figure 11:
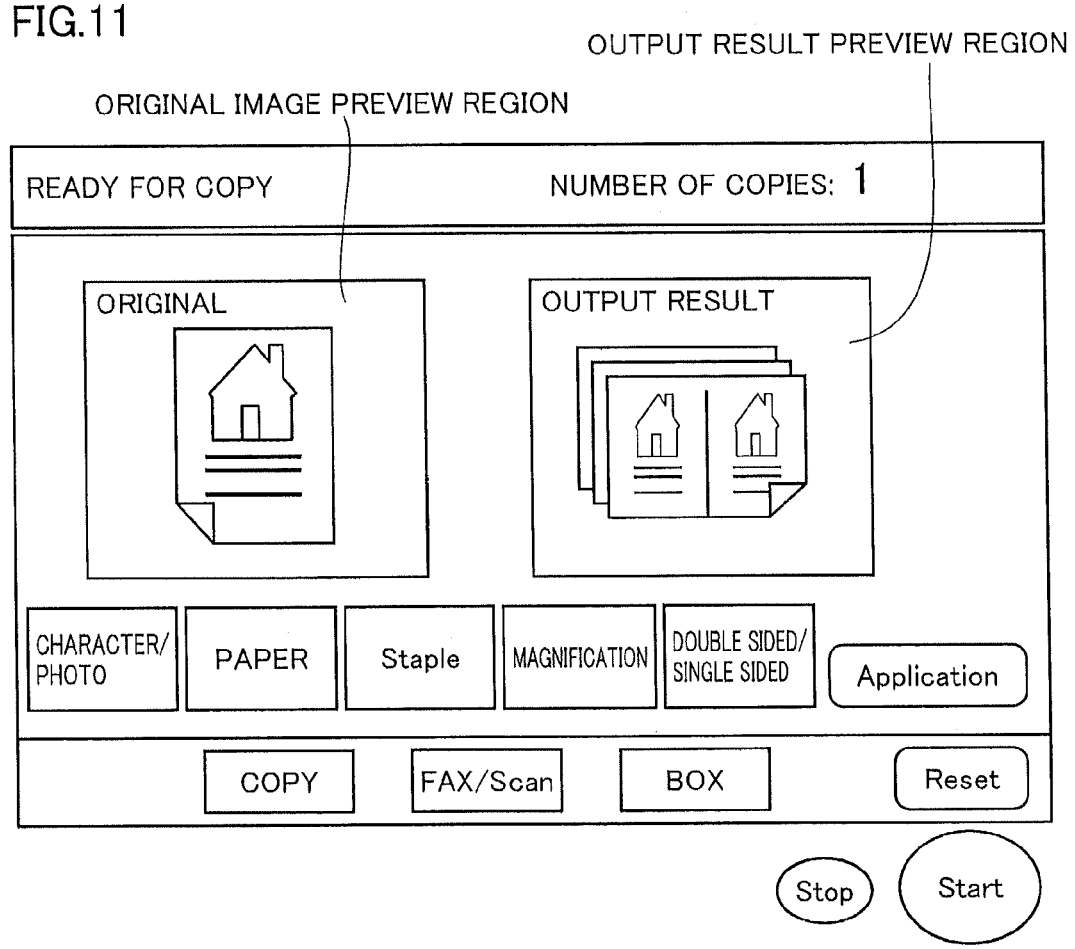
FIG. 11 is a diagram showing a specific example of a display screen of an operation panel.

FIG. 11 is a diagram showing a specific example of a display screen of operation panel 14. In the display screen in FIG. 11, a region in which an original image is previewed on the left side and a region in which an N-in-1 original image is previewed as an output result on the right side are arranged side by side, by way of example. The user can give an instruction to perform setting, copy, or scan through a touch operation on the screen shown in FIG. 11. The user can also perform an operation concerning the settings while looking at the preview of the original image obtained by scanning the original and the preview of the output result obtained when the setting is performed.

In this state, CPU 101 determines whether the user performs an operation on the preview screen, that is, a touch operation on operation panel 14 (S414).

If no operation is performed by the user (NO in S414), it is assumed that output is to be performed with the magnification set in the foregoing magnification setting (S410, S411), that is, with the retained magnification Mx. The process then proceeds to an output image layout process (S420). For example, if Mx=0.707 in the magnification setting (S410, S411) as a result of performing 2-in-1 in the N-in-1 setting (S402), the output image layout process (S420) is performed by scaling down original images of two pages at 0.707× to result in 2-in-1. Accordingly, a preview as shown in FIG. 11 appears.

If an operation on the preview screen is performed by the user (YES in S414), CPU 101 proceeds to the next step S415.

Here, the 2-in-1 setting through a preview operation will be described using specific examples of a preview of an original image and a preview of an N-in-1 original image which are arranged side by side on the display screen of operation panel 14 as shown in FIG. 12 to FIG. 16. FIG. 12 to FIG. 16 only show a region in which an original image is previewed and an N-in-1 original image is previewed, in the display screen of operation panel 14 in FIG. 11, for the sake of explanation. The left region (original image) represents a preview region of an original image, and the right region (output result) represents a preview region of an N-in-1 original image. In the preview region of an original image on the left side, the user's operation is depicted with an arrow.

Preferably, an output paper size frame may be displayed in the output result region on the right side so that the user can easily understand an output manner. Although not shown, for example, paper size=A4, paper orientation=landscape, and the like may be displayed. In the preview region of an N-in-1 original image, an original image is displayed as it is as an output result, if nothing is set yet.

Figure 12:
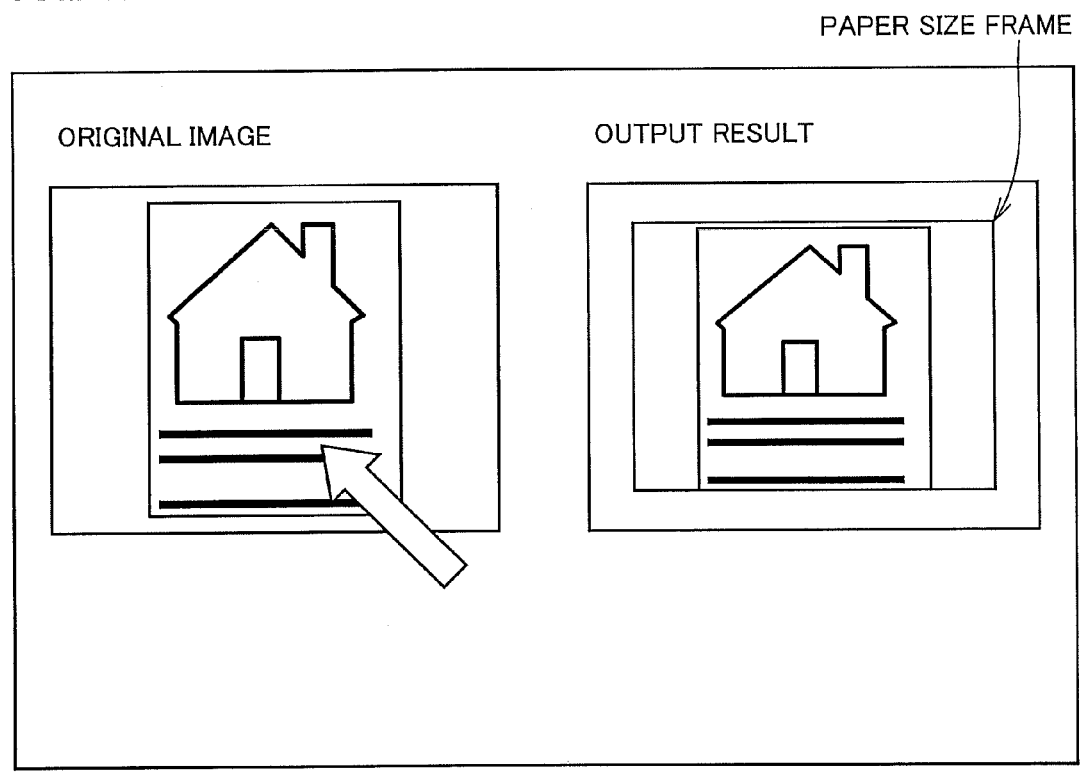
FIG. 12 to FIG. 23 are diagrams each showing an exemplary preview of an original image and an exemplary preview of an N-in-1 original image on the display screen.
Figure 13:
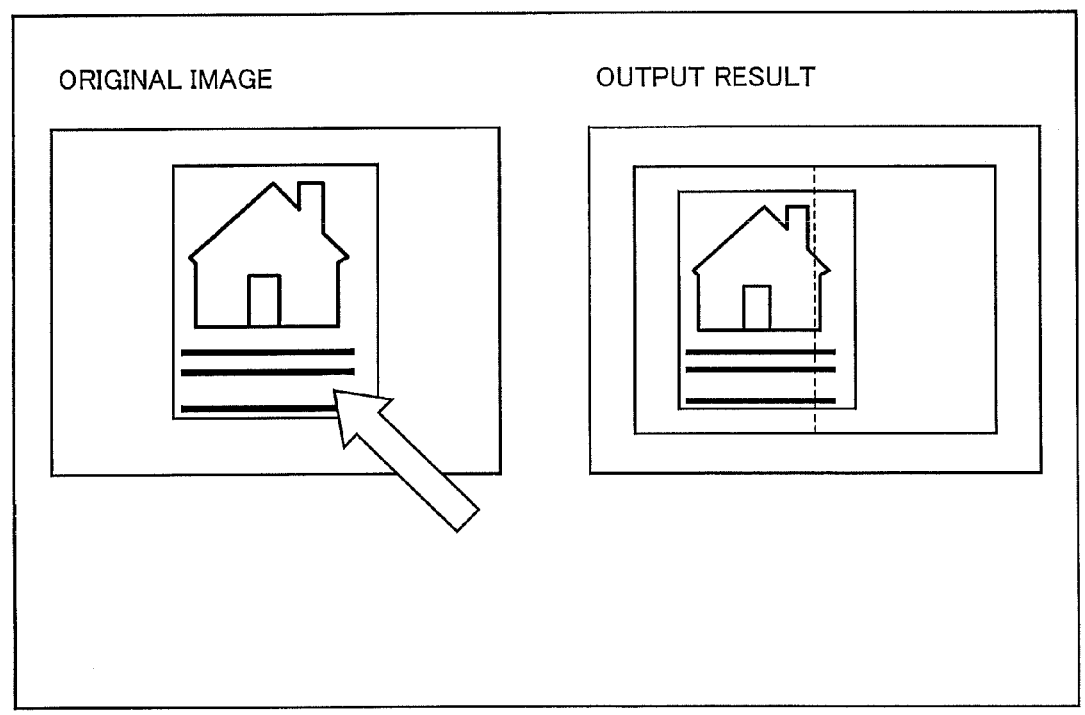

When the user performs an operation to reduce an image on the original image preview screen as shown in FIG. 12, CPU 101 executes a first preview process (S415). Specifically, this process includes an operation of touching the corner position of an object representing an original image on the original image preview screen and moving the touch position in the direction in which the size of the original image is changed, that is, moving the corner toward the center or away from the center. When accepting this operation, CPU 101 displays a reduced original image according to the user's operation as shown in FIG. 13. Here, the operation of moving the touch position in the direction in which the original image is reduced, that is, touching and moving the corner toward the center, is accepted.

Here, CPU 101 executes a first magnification change process (S416) to calculate and change a magnification of reduction. More specifically, CPU 101 detects the distance from the coordinates at which the user's operation is started to the coordinates at which it is moved, using a touch sensor (not shown) on operation panel 14 having the X and Y coordinates arranged in a grid pattern, and calculates a reduction ratio based on the distance. Then, CPU 101 retains the calculated reduction ratio My.

The magnification setting value My can be varied to any value, for example, in decrements of 0.01, such as 1 (the same magnitude) to 0.01, or in decrements of a smaller value, in a similar manner as the magnification Mx. The initial value of the magnification setting value My is initialized to one (=the same magnification) in the initialization process in step S301 above.

Next, CPU 101 compares the reduction ratio My with the threshold values M1 to M4 set in step S412 above and determines which magnification threshold value the reduction ratio My goes beyond (S417).

In the example in FIG. 13, the reduction ratio My is such that M1>My>M2, that is, My is smaller than 1-in-1 (the same magnification) and greater than 2-in-1, and then CPU 101 determines that My does not yet go beyond the magnification threshold value that falls within 2-in-1 (NO in step S417).

Upon such determination, CPU 101 returns to the process of accepting a preview operation (S413) so that the user can keep the reduction operation.

This operation is an operation performed by the user for the 2-in-1 setting. Therefore, when the operation depicted on the left side in FIG. 12 to FIG. 13 is detected, CPU 101 preferably displays a border line (dotted line) to indicate 2-in-1 in the output paper size frame in the output result preview region, as shown on the right side in FIG. 13. This makes the user to intuitively easily understand the relation between the size of the original image and the size of the image in 2-in-1.

Figure 14:
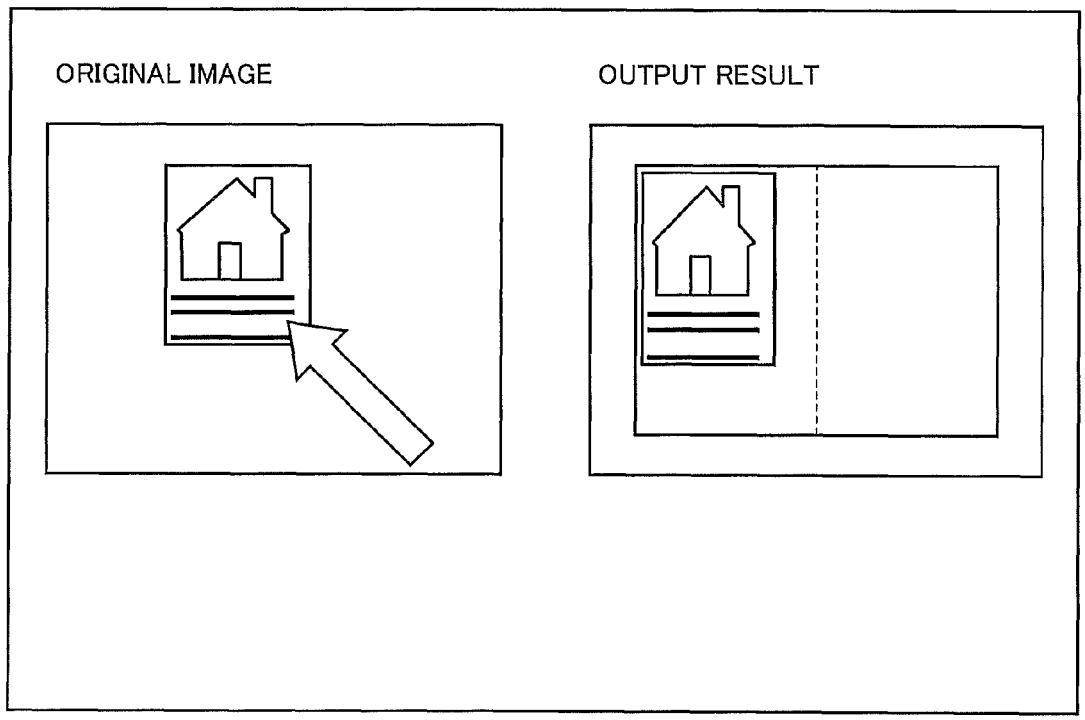

As shown in FIG. 14, if it is determined that the reduction ratio My is such that My<M2, that is, My is smaller than 2-in-1 (YES in S417), it can be assumed that the user continues the reduction operation not intentionally but by mistake. In this case, as shown on the right side in FIG. 14, the image is displayed smaller than the region of 2-in-1.

Figure 15:
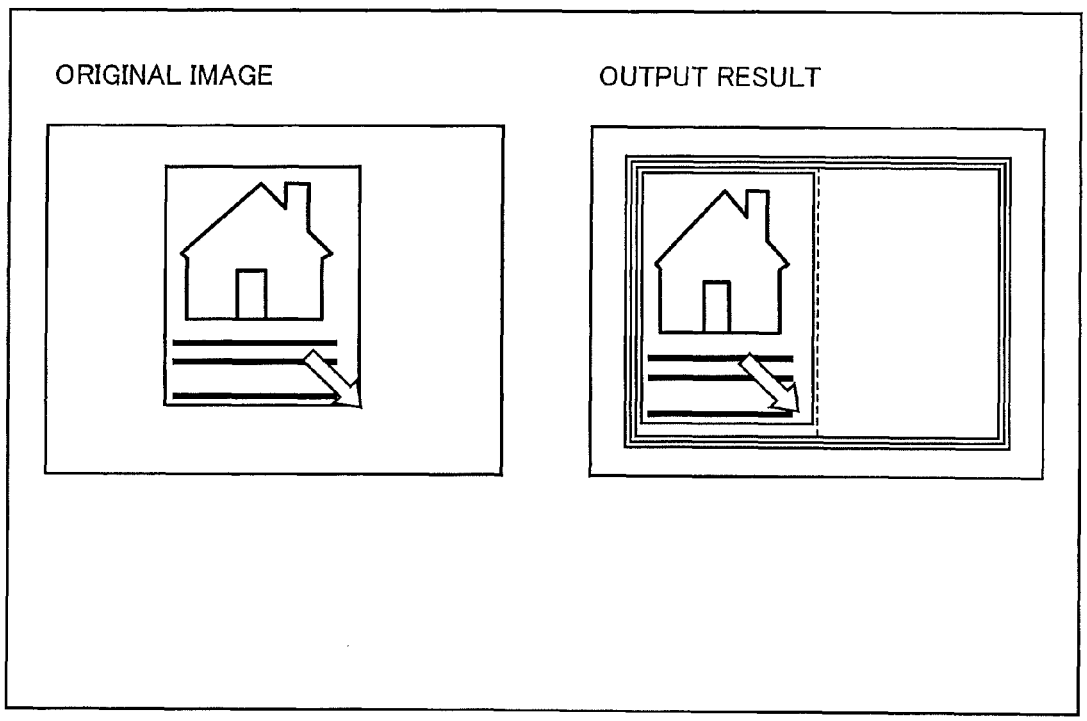

In this case, if the user terminates the preview operation in this state and outputs print with the magnification according to this operation, print is failed without effectively using the paper size in which essentially 2-in-1 can be printed. Therefore, in the case of this state, that is, in the case where the magnification according to the operation accepted in the preview operation goes beyond the set magnification threshold value, CPU 101 executes a second preview process (S418). Specifically, CPU 101 changes the display such that the preview is fitted in 2-in-1 as shown in FIG. 15. In other words, the preview is enlarged because the image has become too small with the magnification according to the operation accepted in the preview operation.

Here, CPU 101 also executes a second magnification change process (S419) to change the setting such that the reduction ratio My=M2. If the magnification M2 after change is the same value as the magnification Mx automatically set by image forming apparatus 100, My=Mx may be set.

Here, as shown in the example in FIG. 15, CPU 101 preferably changes the display manner of the paper size frame so that the user can easily understand that the magnification has been changed. Examples of the changed display manner include a color change, a highlight, and an arrow.

Figure 16:
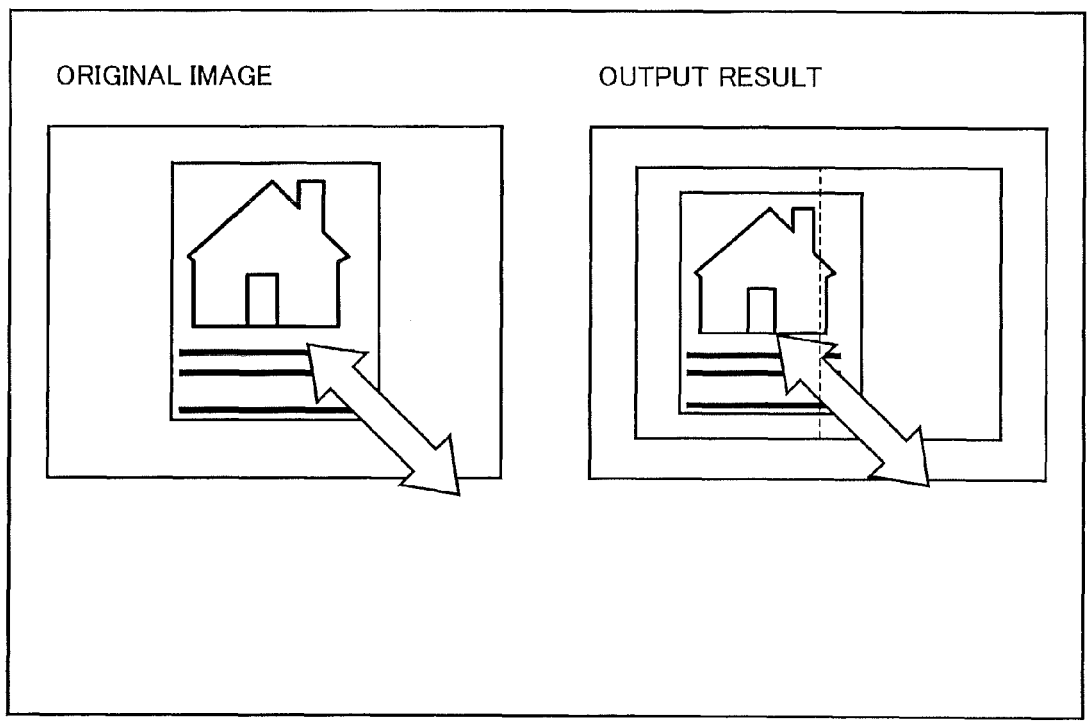

As shown in FIG. 16, the preview operation by the user may be not only an operation in the reduction direction but also an operation in reduction and enlargement directions. The process in the enlargement direction is similar as described above.

When the second magnification change process in step S419 above is finished, CPU 101 executes an output image layout process (S420). In this process, CPU 101 lays out an original image scaled in the reduction ratio My such that it is fitted in 2-in-1, and returns the process to the transmission process request in step S311 above.

Figure 17:
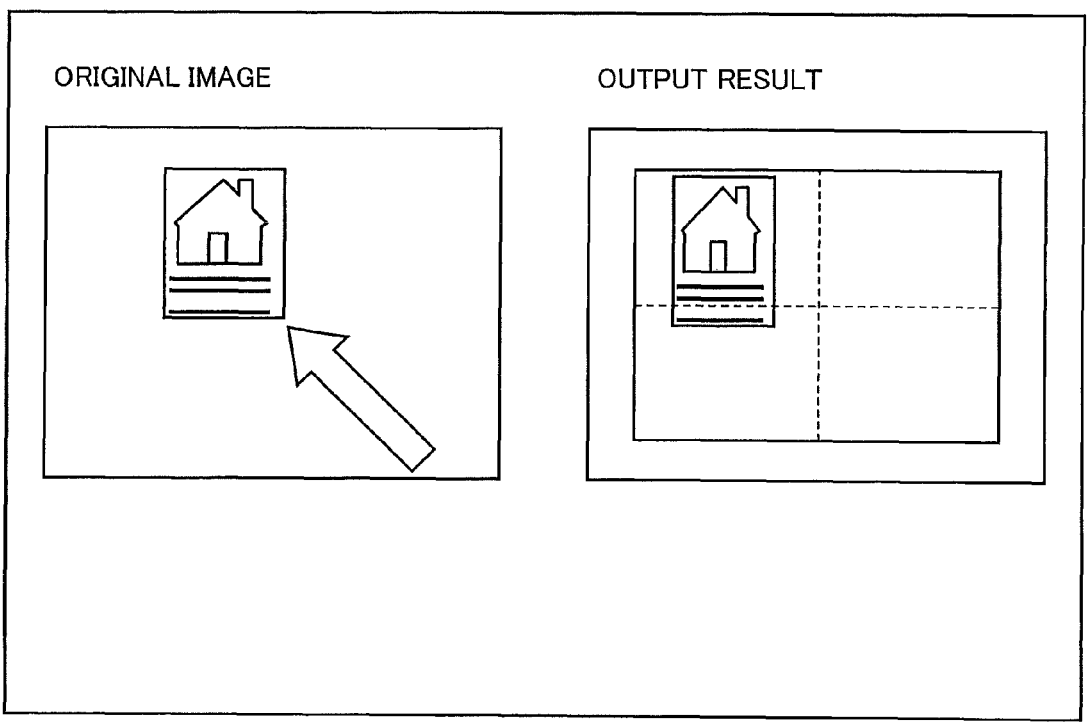
Figure 18:
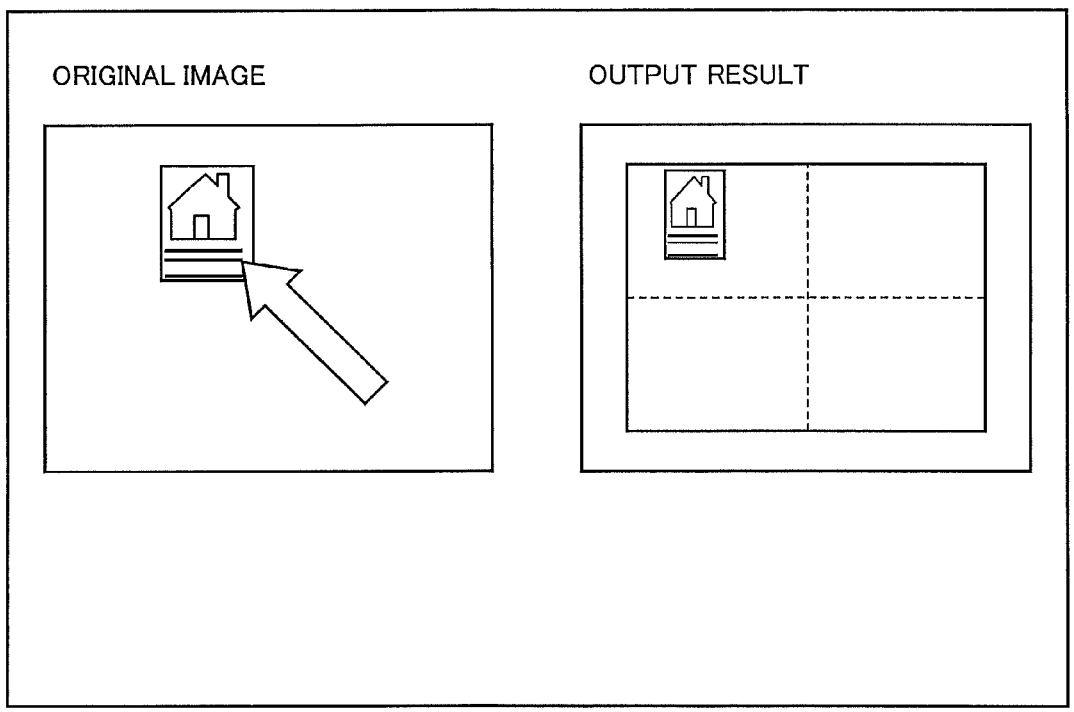
Figure 19:
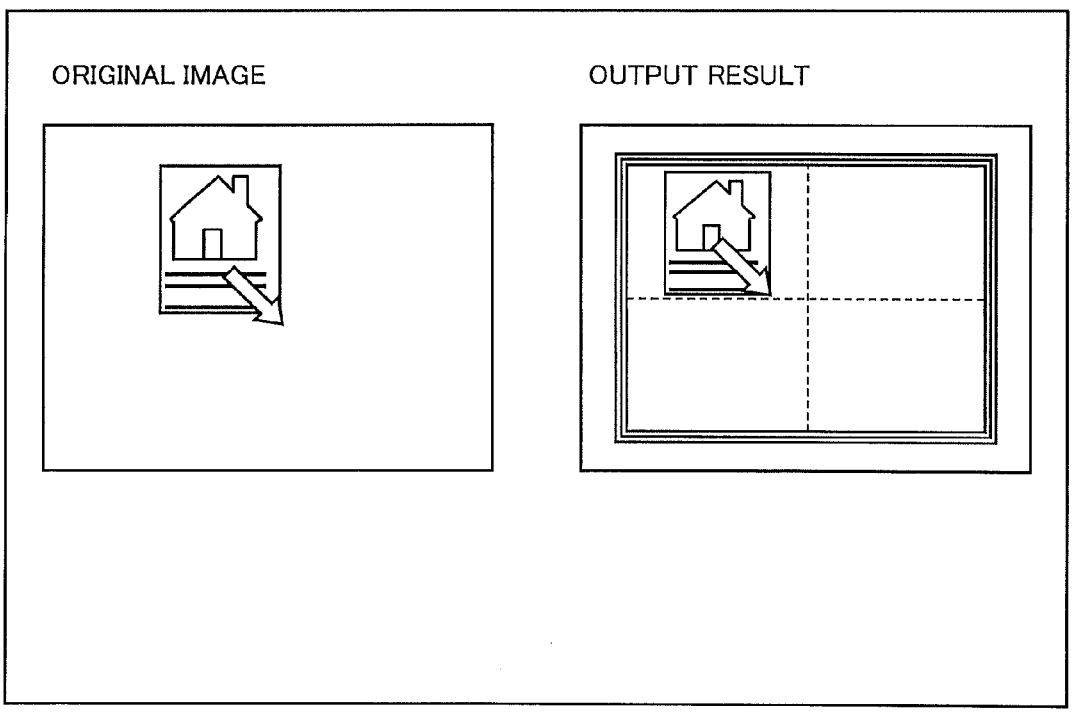

In the example above, the 2-in-1 setting is made through the preview operation. As another example, the 4-in-1 setting through a preview operation will be described using specific examples of a preview image of an original image and a preview image of an N-in-1 original image which are arranged side by side on the display screen of operation panel 14, as shown in FIG. 17 to FIG. 19. FIG. 17 to FIG. 19 only show a region in which an original image is previewed and a region in which an N-in-1 original image is previewed, in the display screen of operation panel 14 in FIG. 11, for the sake of explanation. The left region (original image) represents a preview region of an original image, and the right region (output result) represents a preview region of an N-in-1 original image. In the preview region of an original image on the left side, the user's operation is depicted with an arrow.

The 4-in-1 operation is extension of the 2-in-1 operation. Therefore, when the user further performs an operation to reduce the image in the original image preview screen in the state in FIG. 14, CPU 101 executes the first preview process (S415) to display the reduced original image in accordance with the user's operation as shown in FIG. 17.

Here, the ratio of reduction is calculated by detecting the distance from the coordinates at which the user's operation is started to the coordinates at which it is moved, and calculating the reduction ratio based on the distance, in a similar manner as described above. The reduction ratio My is then retained.

CPU 101 compares the reduction ratio My with the magnification threshold values M1 to M4 set in step S412 above and determines which magnification threshold value the reduction ratio My goes beyond (S417).

In the example in FIG. 17, the reduction ratio My is such that M2>My>M3, that is, My is smaller than the magnification of 2-in-1 and greater than 4-in-1. Therefore, CPU 101 determines that My does not yet go beyond the magnification threshold value that falls within 4-in-1 (NO in step S417).

Upon such determination, CPU 101 returns to the process of accepting a preview operation (S413) so that the user can continue the reduction operation.

This operation is an operation performed by the user for the 4-in-1 setting. Therefore, when the operation depicted on the left side in FIG. 17 is detected, CPU 101 preferably displays a border line (dotted line) to indicate 4-in-1 in the output paper size frame in the output result preview region, as shown on the right side in FIG. 17. This makes the user to intuitively easily understand the relation between the size of the original image and the size of the image in 4-in-1.

As shown in FIG. 18, if it is determined that the reduction ratio My is such that My<M3 or My<M4, that is, My is smaller than 4-in-1 (YES in S417), it can be assumed that the user continues the reduction operation not intentionally but by mistake. In this case, as shown on the right side in FIG. 18, the image is displayed smaller than the region of 4-in-1.

In this case, if the user terminates the preview operation in this state and outputs print with the magnification according to this operation, print is failed without effectively using the paper size in which essentially 4-in-1 can be printed. Therefore, in the case of this state, that is, in the case where the magnification according to the operation accepted in the preview operation goes beyond the set magnification threshold value, CPU 101 executes a second preview process (S418) to change the display such that the preview is fitted in 4-in-1.

Here, CPU 101 also executes a second magnification change process (S419) to change the settings such that the reduction ratio My=M3 or My=M4. If the magnification M3 or M4 after change is the same value as the magnification Mx automatically set by image forming apparatus 100, My=Mx may be set.

However, if Mx is a value greater than M4 in relation to the original image orientation and the paper size orientation as described above (if a larger output is possible with respect to the paper size), CPU 101 sets My=Mx or My=M3 rather than My=M4.

For example, as shown in FIG. 9B and FIG. 9C, if the original image orientation is landscape: Mx=0.5, the original image orientation is portrait: Mx=0.353, CPU 101 sets My=M3 (0.5×) rather than My=M4 (0.353×).

Here, in a similar manner as in the example in FIG. 15, CPU 101 preferably changes the display manner of the paper size frame so that the user can easily understand that the magnification has been changed, as shown in FIG. 19.

When the second magnification change process in step S419 above is finished, CPU 101 executes an output image layout process (S420). In this process, CPU 101 lay outs the original image scaled in the reduction ratio My such that it is fitted in 4-in-1, and returns the process to the transmission process request in step S311 above.

In the example above, the N-in-1 setting is accepted in step S402 above, and the N-in-setting is thereafter set again by accepting an operation on the preview in step S413 above. However, one of the setting in step S402 and the setting based on the operation on the preview in step S413 may be given higher priority in the magnification setting. This setting may be made on operation panel 14, for example, or may be transmitted from another device in connection with image data.

Other Examples

In FIG. 12 to FIG. 16 and FIG. 17 to FIG. 19, only one page of original image has been used in the description. However, in actuality, the scanned original images may extend across a plurality of pages. In this case, the user makes the N-in-1 setting, for example, 2-in-1 or 4-in-1, while confirming not only the size of the preview of the original image but also the characters and images of original images, the page number, or whether the next page exists. Therefore, the information about a plurality of pages may be displayed in a preview.

Then, an example of display on operation panel 14 will be described in a case where, when the original to be previewed contains a plurality of pages, CPU 101 performs the process following step S413 above to make the 2-in-1 setting and the 4-in-1 setting based on the user's preview operation. Here, the user performs a preview operation in the flow from 2-in-1 to 4-in-1, by way of example. The reduction operation is as described above.

FIG. 20 to FIG. 23 are diagrams each showing an exemplary preview of an original image on the display screen and an exemplary preview of an N-in-1 original image.

CPU 101 displays the page numbers, starting from one, in order in which original images are scanned.

In order to display a plurality of pages, CPU 101 repeats a process of adding a preview of an original image on the subsequent page every time a reduction ratio My based on a preview operation on one page falls within a predetermined range or goes beyond a magnification threshold value as a result of comparison with the magnification threshold value as described above.

Figure 20:
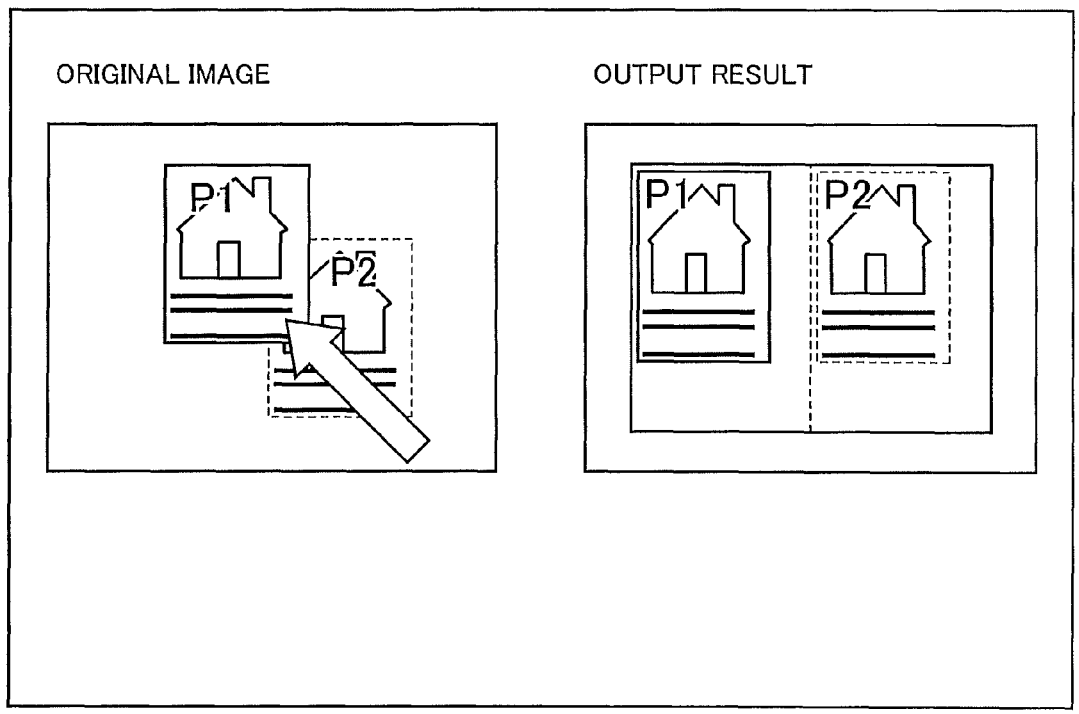
Figure 21:
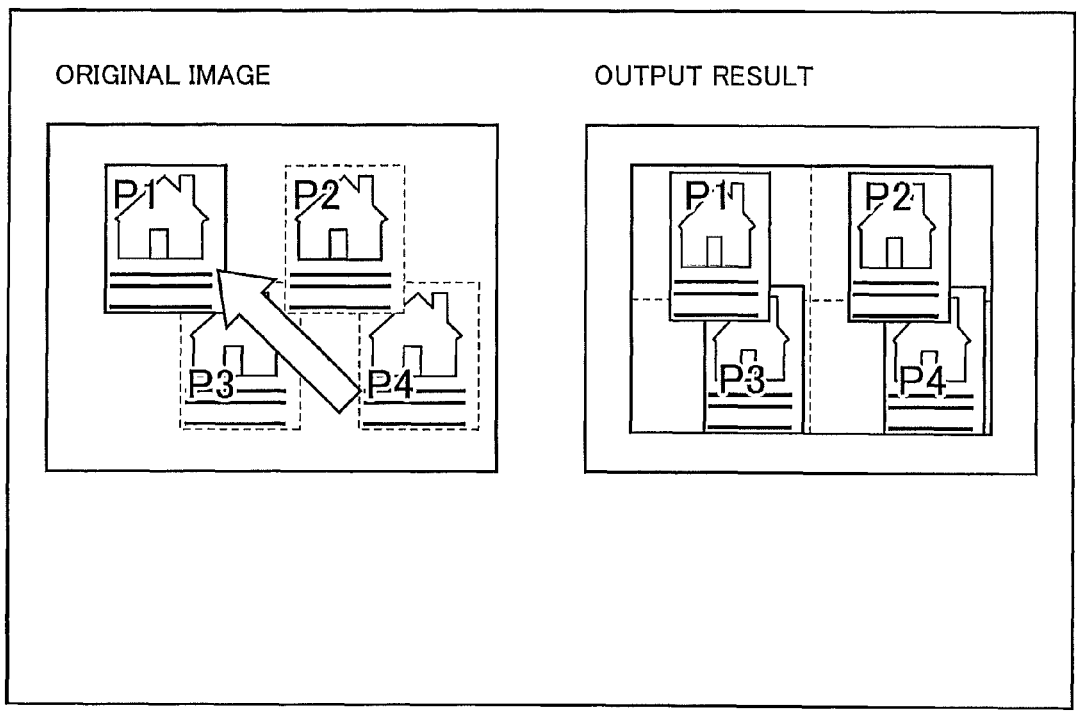

At a point of time of display in FIG. 20, only two pages are displayed. In a case where the third and subsequent pages exist, when the user further performs a reduction operation on the preview of the original image in the display state in FIG. 20, CPU 101 additionally displays four pages in the 4-in-1 layout in the preview region after the N-in-1 setting, as shown in FIG. 21, at the point of time when the magnification is determined as described above.

The original image that can be operated by the user may be limited to the front page, by way of example. More specifically, CPU 101 may not accept an operation on the previews of the added original images on the second and subsequent pages. In this case, preferably, CPU 101 displays the previews of the original images on the second and following pages in a manner different from the preview of the front page (first page), so that the user can understand that the previews of the original images on the second and subsequent pages cannot be operated. Specifically, the display of the front page is decreased in lightness or brightness or increased in transparency (rendered translucent).

More preferably, CPU 101 displays the previews of the original images on the second and subsequent pages to be added, at the same magnification as the preview of the original image on the front page to be operated by the user, so that the user can easily understand the N-in-1 layout.

Figure 22:
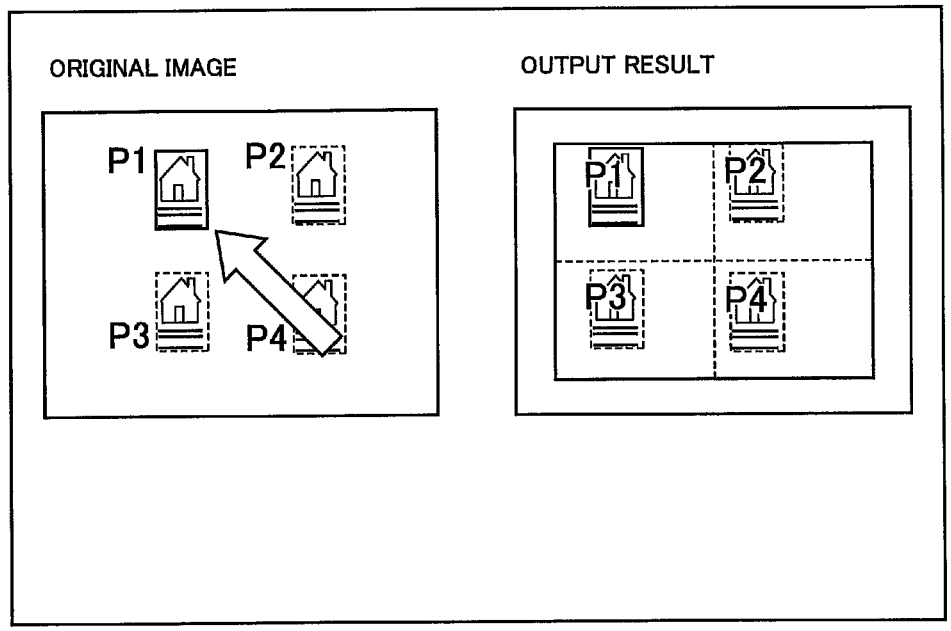
Figure 23:
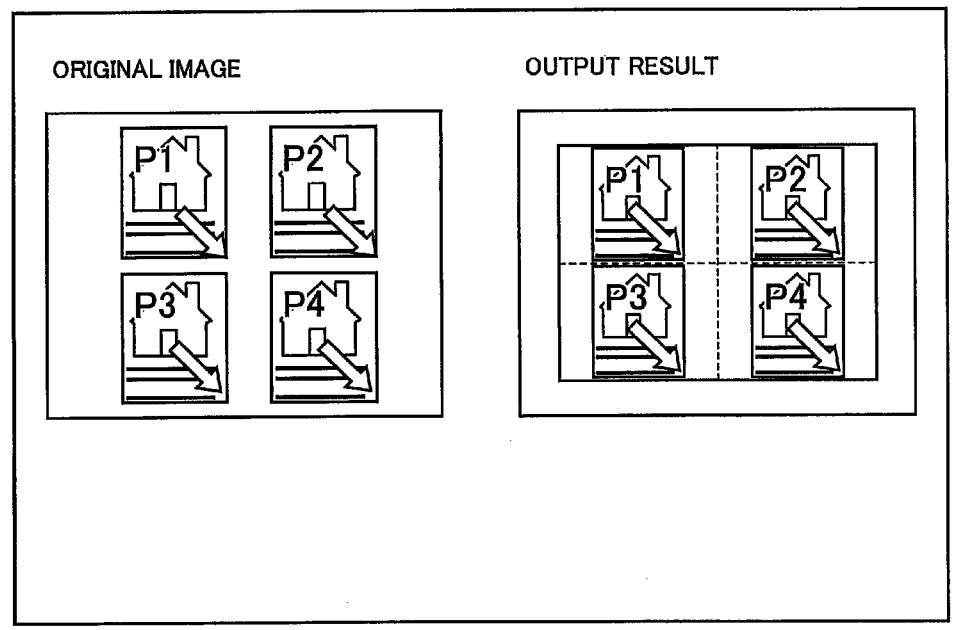

In the case where the preview of the original image according to the user's operation is much smaller than the size of N-in-1 as shown in FIG. 22, the user's operating error may be assumed. CPU 101 then changes (in this case, enlarges) the display magnification according to the N-in-1 size closest at that point of time as shown in FIG. 23. In this case, CPU 101 lays out the original images to be fitted in 4-in-1 in the output image layout process in step S420 above and returns the process to the transmission process in step S311 above.

Effects of Embodiment

The process described above in image forming apparatus 100 allows the user to make the N-in-1 setting using a preview on operation panel 14. At that time, image forming apparatus 100 displays the user's operation of scaling (enlarging or reducing) the preview image so that the user can easily understand. In addition, a failure in the N-in-1 printing due to reduction by an operating error can be prevented.

A control program may be provided which allows image forming apparatus 100 to execute the process as described above. Such a program may be recorded in a computer readable recording medium included in a computer, such as a flexible disk, a CD-ROM (Compact Disk-Read Only Memory), a ROM, a RAM, and a memory card, and provided as a program product. Alternatively, the program may be recorded in a recording medium such as a hard disk contained in a computer. Alternatively, the program may be downloaded via a network.

The program in accordance with the present invention may allow the process to be executed by invoking necessary modules, among program modules provided as a part of Operation System (OS) of a computer, in a prescribed sequence at a prescribed timing. In this case, the aforementioned modules are not included in the program itself and the process is executed in cooperation with OS. The program that does not include such modules may also be included in the program in accordance with the present invention.

Furthermore, the program in accordance with the present invention may be built in a part of another program. In this case, the modules included in another program are not included in the program itself, and the process is executed in cooperation with another program. Such a program built in another program may also be included in the program in accordance with the present invention.

The program product to be provided is installed in a program storage portion such as a hard disk for execution. It is noted that the program product includes the program itself and a recording medium encoded with the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus for performing combine setting, comprising:
    an input unit for accepting an operation input by a user;
    a setting unit for performing combine setting for arranging a plurality of designated original images onto a sheet of output paper in combination; and
    a display unit for previewing at least one original image of said plurality of designated original images and an output result thereof on a display device, wherein
    when said input unit accepts an instruction for combine setting, said setting unit executes a first setting process of setting a reduction ratio of said original image as a first reduction ratio based on an orientation of said original image and an orientation of said output paper, and
    when said input unit accepts an instruction to change the reduction ratio of said previewed original image, said setting unit executes a second setting process of calculating a reduction ratio after said change as a second reduction ratio, comparing said first reduction ratio with said second reduction ratio, and, if said second reduction ratio falls within a prescribed range from said first reduction ratio, setting said first reduction ratio as a reduction ratio of said original image for arranging on said sheet of output paper in combination.

2. The image forming apparatus according to claim 1, wherein
    in said first setting process,
    when a number N of originals to be combined is two to an odd power and when said original image and said output paper are in a same orientation, said setting unit sets a reduction ratio of said original to 1/2N, and when a number N of originals to be combined is two to an odd power and when said original image and said output paper are in different orientations, said setting unit sets a reduction ratio of said original to 1/N, and when a number N of originals to be combined is two to an even power and when said original image and said output paper are in a same orientation, said setting unit sets a reduction ratio of said original to 1/N, and when a number N of originals to be combined is two to an even power and when said original image and said output paper are in different orientations, said setting unit sets a reduction ratio of said original to 1/2N.

3. The image forming apparatus according to claim 1, wherein when said input unit does not accept an instruction for combine setting, said setting unit does not perform said first setting process and compares a reduction ratio stored beforehand with a reduction ratio of said original image in said previewed output result, and, if said reduction ratio stored beforehand is greater than said reduction ratio in said preview, said setting unit sets said reduction ratio stored beforehand as a reduction ratio of said original image for arranging on said sheet of output paper in combination.

4. The image forming apparatus according to claim 1, wherein
said display device includes a touch panel as one of said input unit, and
said setting unit calculates said second reduction ratio based on a moving distance of a touch position with said instruction to change the reduction ratio that is accepted by said touch panel as said input unit.

5. The image forming apparatus according to claim 1, wherein
said display unit updates said preview of said output result according to the reduction ratio set in said second setting process in said setting unit, and, in said update, displays a layout frame according to a size of said output paper and a number of said original images to be arranged in combination such that said layout frame is superimposed on said preview of said output result.

6. The image forming apparatus according to claim 1, wherein
when said input unit accepts an instruction to change the reduction ratio of said previewed original image, said display unit displays, in said preview of said output result, an output result in which a plurality of original images are combined according to the reduction ratio set in said second setting process.

7. The image forming apparatus according to claim 1, wherein said display unit previews said plurality of original images with page numbers.

8. The image forming apparatus according to claim 1, further comprising a setting unit for presetting a reduction ratio to be adopted as a reduction ratio of said original image for arranging on said sheet of output paper in combination, from between the reduction ratio set in accordance with the instruction for combine setting in said input unit and the reduction ratio set in accordance with the instruction to change the reduction ratio of said previewed original image in said input unit.

9. An image forming apparatus for performing combine setting, comprising:
an input unit for accepting an operation input by a user;
a setting unit for performing combine setting for arranging a plurality of designated original images onto a sheet of output paper in combination; and
a display unit for previewing at least one original image of said plurality of designated original images and an output result thereof on a display device, wherein when said input unit accepts an instruction for combine setting, said setting unit executes a first setting process of setting a reduction ratio of said original image as a first reduction ratio based on an orientation of said original image and an orientation of said output paper, and when said input unit accepts an instruction to change the reduction ratio of said previewed original image, said setting unit executes a second setting process of calculating a reduction ratio after said change as a second reduction ratio, comparing said first reduction ratio with said second reduction ratio, and, if said second reduction ratio is greater than said first reduction ratio, setting said first reduction ratio as a reduction ratio of said original image for arranging on said sheet of output paper in combination.

10. The image forming apparatus according to claim 9, wherein
in said first setting process,
when a number N of originals to be combined is two to an odd power and when said original image and said output paper are in a same orientation, said setting unit sets a reduction ratio of said original to 1/2N, and when a number N of originals to be combined is two to an odd power and when said original image and said output paper are in different orientations, said setting unit sets a reduction ratio of said original to 1/N, and when a number N of originals to be combined is two to an even power and when said original image and said output paper are in a same orientation, said setting unit sets a reduction ratio of said original to 1/N, and when a number N of originals to be combined is two to an even power and when said original image and said output paper are in different orientations, said setting unit sets a reduction ratio of said original to 1/2N.

11. The image forming apparatus according to claim 9, wherein when said input unit does not accept an instruction for combine setting, said setting unit does not perform said first setting process and compares a reduction ratio stored beforehand with a reduction ratio of said original image in said previewed output result, and, if said reduction ratio stored beforehand is greater than said reduction ratio in said preview, said setting unit sets said reduction ratio stored beforehand as a reduction ratio of said original image for arranging on said sheet of output paper in combination.

12. The image forming apparatus according to claim 9, wherein
said display device includes a touch panel as one of said input unit, and
said setting unit calculates said second reduction ratio based on a moving distance of a touch position with said instruction to change the reduction ratio that is accepted by said touch panel as said input unit.

13. The image forming apparatus according to claim 9, wherein
said display unit updates said preview of said output result according to the reduction ratio set in said second setting process in said setting unit, and, in said update, displays a layout frame according to a size of said output paper and a number of said original images to be arranged in combination such that said layout frame is superimposed on said preview of said output result.

14. The image forming apparatus according to claim 9, wherein
when said input unit accepts an instruction to change the reduction ratio of said previewed original image, said display unit displays, in said preview of said output result, an output result in which a plurality of original images are combined according to the reduction ratio set in said second setting process.

15. The image forming apparatus according to claim 9, wherein said display unit previews said plurality of original images with page numbers.

16. The image forming apparatus according to claim 9, further comprising a setting unit for presetting a reduction ratio to be adopted as a reduction ratio of said original image for arranging on said sheet of output paper in combination, from between the reduction ratio set in accordance with the instruction for combine setting in said input unit and the reduction ratio set in accordance with the instruction to change the reduction ratio of said previewed original image in said input unit.

17. An image processing method in an image forming apparatus that performs combine setting, comprising the steps of:
accepting an instruction for combine setting from an input device;
setting a reduction ratio of an original image as a first reduction ratio based on an orientation of said original image and an orientation of output paper in accordance with said instruction;
previewing said original image and an output result thereof on a display device;
accepting, from said input device, an instruction to change the reduction ratio of said previewed original image;
calculating a reduction ratio after said change as a second reduction ratio; and
comparing said first reduction ratio with said second reduction ratio, and, if said second reduction ratio falls within a prescribed range from said first reduction ratio, setting said first reduction ratio as a reduction ratio of said original image for arranging on said sheet of output paper in combination.

18. An image processing method in an image forming apparatus that performs combine setting, comprising the steps of:
accepting an instruction for combine setting from an input device;
setting a reduction ratio of an original image as a first reduction ratio based on an orientation of said original image and an orientation of output paper in accordance with said instruction;
previewing said original image and an output result thereof on a display device;
accepting, from said input device, an instruction to change the reduction ratio of said previewed original image;
calculating a reduction ratio after said change as a second reduction ratio; and
comparing said first reduction ratio with said second reduction ratio, and, if said second reduction ratio is greater than said first reduction ratio, setting said first reduction ratio as a reduction ratio of said original image for arranging on said sheet of output paper in combination.

19. A non-transitory computer readable storage medium storing a program, which upon being executed causes a controller of an image forming apparatus to perform combine setting comprising the steps of:
accepting an instruction for combine setting from an input device;
setting a reduction ratio of an original image as a first reduction ratio based on an orientation of said original image and an orientation of output paper in accordance with said instruction;
previewing said original image and an output result thereof on a display device;
accepting, from said input device, an instruction to change the reduction ratio of said previewed original image;
calculating a reduction ratio after said change as a second reduction ratio; and
comparing said first reduction ratio with said second reduction ratio, and, if said second reduction ratio falls within a prescribed range from said first reduction ratio, setting said first reduction ratio as a reduction ratio of said original image for arranging on said sheet of output paper in combination.

20. A non-transitory computer readable storage medium storing a program, which upon being executed causes a controller of an image forming apparatus to perform combine setting comprising the steps of:
accepting an instruction for combine setting from an input device;
setting a reduction ratio of an original image as a first reduction ratio based on an orientation of said original image and an orientation of output paper in accordance with said instruction;
previewing said original image and an output result thereof on a display device;
accepting, from said input device, an instruction to change the reduction ratio of said previewed original image;
calculating a reduction ratio after said change as a second reduction ratio; and
comparing said first reduction ratio with said second reduction ratio, and, if said second reduction ratio is greater than said first reduction ratio, setting said first reduction ratio as a reduction ratio of said original image for arranging on said sheet of output paper in combination.

* * * * *